US012676749B1

(12) United States Patent
Lee

(10) Patent No.: US 12,676,749 B1
(45) Date of Patent: Jul. 7, 2026

(54) PRE-INFERENCE EXECUTION COMPLIANCE FOR ARTIFICIAL INTELLIGENCE SYSTEMS

(71) Applicant: Yong Bok Lee, Sheridan, WY (US)

(72) Inventor: Yong Bok Lee, Sheridan, WY (US)

(73) Assignee: The Lamb within the Lion LLC

( * ) Notice: Subject to any disclaimer, the term of this patent is extended or adjusted under 35 U.S.C. 154(b) by 0 days.

(21) Appl. No.: 19/542,860

(22) Filed: Feb. 18, 2026

Related U.S. Application Data

(63) Continuation-in-part of application No. 19/182,513, filed on Apr. 17, 2025.

(60) Provisional application No. 63/775,200, filed on Mar. 20, 2025.

(51) Int. Cl.
    *H04L 9/32*        (2006.01)
    *H04L 9/00*        (2022.01)

(52) U.S. Cl.
    CPC .......... *H04L 9/3236* (2013.01); *H04L 9/3213* (2013.01); *H04L 9/3218* (2013.01); *H04L 9/3247* (2013.01); *H04L 9/3265* (2013.01); *H04L 9/3268* (2013.01); *H04L 9/50* (2022.05)

(58) Field of Classification Search
None
See application file for complete search history.

(56) References Cited

U.S. PATENT DOCUMENTS 8,326,579 B2  12/2012  Wilson et al.
9,467,292 B2  10/2016  Nahari
10,122,533 B1 *  11/2018  Werner ............... H04L 41/0816
(Continued)

FOREIGN PATENT DOCUMENTS

DE       102023127193 A1 *  4/2025  ........... H04L 9/3247
WO    WO-2024227510 A1 *  11/2024  ............. G06F 21/57

OTHER PUBLICATIONS

Sankar et al., "A Secured Signature Verification Scheme with Multiple Attribute based Electronic Health Record Maintenance Scheme using Blockchain Technology", 2025 International Conference on Recent Innovation in Science Engineering and Technology (ICRISET) (2025, pp. 1-9), (Year: 2025).*

(Continued)

*Primary Examiner* — Piotr Poltorak

(57) ABSTRACT

Systems and methods enforce pre-inference execution compliance for an AI system. An execution request with an origin signal is received. A Root-Origin Hash Signature (ROHS) digest is generated and matched to a Covenant Root Authority (CRA) credential to authenticate origin. An execution context is validated against an Immutable Constraint Chain (ICC) protected in an Encrypted Logic Vault (ELV), optionally bound to a policy epoch to detect rollback. Authentication and validation results are routed to nodes that generate a quorum-signed verdict record. A gate permits the request to reach an inference engine or action executor when the verdict is verified; otherwise execution is denied before inference or action and evidence is recorded in an Eternal Arbitration Ledger (EAL). An evidence pack may be signed for offline verification and may support selective disclosure or zero-knowledge compliance proofs. Optional features include hardware-backed attestation, Merkle proofs, tier-based thresholds, jurisdiction scoring, entitlement metering, and anchoring.

30 Claims, 17 Drawing Sheets

(56) References Cited

U.S. PATENT DOCUMENTS

| | | | |
|---|---|---|---|
| 10,581,613 B2 | 3/2020 | Ford et al. | |
| 11,163,858 B2 | 11/2021 | Taylor | |
| 11,327,735 B2 | 5/2022 | Smith et al. | |
| 11,626,996 B2 * | 4/2023 | Campagna | H04L 9/0822 |
| | | | 713/168 |
| 11,860,995 B2 | 1/2024 | Shannon et al. | |
| 12,003,649 B2 * | 6/2024 | Wang | G06F 21/44 |
| 12,095,916 B2 | 9/2024 | Maeding et al. | |
| 12,095,919 B2 | 9/2024 | Stefanich | |
| 2002/0116611 A1 | 8/2002 | Zhou et al. | |
| 2007/0241861 A1 | 10/2007 | Venkatanna et al. | |
| 2008/0066148 A1 | 3/2008 | Lim | |
| 2018/0013562 A1 | 1/2018 | Haider et al. | |
| 2018/0287802 A1 | 10/2018 | Brickell | |
| 2021/0174305 A1 | 6/2021 | Schornack et al. | |
| 2022/0343004 A1 | 10/2022 | Sobot et al. | |
| 2023/0179425 A1 | 6/2023 | Brown et al. | |
| 2023/0222230 A1 | 7/2023 | Hopkins | |
| 2023/0237200 A1 * | 7/2023 | Chitnis | G06F 21/44 |
| | | | 713/193 |
| 2024/0241960 A1 | 7/2024 | King et al. | |
| 2024/0283664 A1 | 8/2024 | Islam et al. | |
| 2024/0422013 A1 * | 12/2024 | Wang | G06F 21/33 |

OTHER PUBLICATIONS

Jun. 2013—Laurie et al.—"Certificate Transparency"—RFC 6962.
Jun. 2020—Rundgren et al.—"JSON Canonicalization Scheme (JCS)"—RFC 8785.
1999—Castro; Liskov—"Practical Byzantine Fault Tolerance"—Proc. OSDI '99.
2014—Birgisson et al.—"Macaroons: Cookies with Contextual Caveats . . . "—Proc. NDSS 2014.
2019—Torres-Arias et al.—"in-toto: Providing farm-to-table guarantees . . . "—Proc. USENIX Security 2019.
2010—Samuel et al.—"Survivable Key Compromise in Software Update Systems"—Proc. ACM CCS 2010.
2022—Newman; Meyers; Torres-Arias—"Sigstore: Software Signing for Everybody"—Proc. ACM CCS 2022.
Nov. 2019—Trusted Computing Group (TCG)—"TPM 2.0 Library, Part 1: Architecture"—TCG Spec.
Feb. 2016—Costan; Devadas—"Intel SGX Explained"—IACR ePrint 2016/086.
2018—Bünz et al.—"Bulletproofs: Short Proofs for Confidential Transactions and More"—IEEE S&P 2018.

* cited by examiner

Execution Compliance System 100

Integrated Architecture Diagram (System 100)

Example Deployment Integration Patterns (non-limiting)

Pattern A: API Gateway

| Request 152 | Gate 180 | Runtime 182 |

Inference API Boundary 181

Pattern B: Runtime Wrapper

| Request 152 | Gate 180 | Runtime 182 |

Model runtime wrapper

Pattern C: Tool Boundary

| Request 152 | Gate 180 | Runtime 182 |

Tool invocation boundary

Pattern D: Container Entry

| Request 152 | Gate 180 | Runtime 182 |

Container entry point

PRE-INFERENCE EXECUTION COMPLIANCE FOR ARTIFICIAL INTELLIGENCE SYSTEMS

Non-trademark and terminology notice (illustrative; non-limiting). The terms "AI-SEL," "Root-Origin Hash Signature (ROHS)," "Covenant Root Authority (CRA)," "Immutable Constraint Chain (ICC)," "Encrypted Logic Vault (ELV)," "GEN Node," "Distributed Verdict Engine (DVE)," "Tier Trust Engine (TTE)," "Eternal Arbitration Ledger (EAL)," "Triune Execution Signature (TES)," "Sovereign Signature Log (SSL)," and "Recursive Consent Suppression Layer (RCSL)" are used as convenient labels for describing components and operations. Such labels do not indicate trademark use. Unless explicitly stated otherwise, these labels refer to technical mechanisms (e.g., cryptographic credentials, policy validation structures, and signed authorization records) rather than brand names.

II. CROSS-REFERENCE TO RELATED APPLICATIONS

This application claims the benefit of U.S. Provisional Patent Application No. 63/775,200, filed Mar. 20, 2025, the entire contents of which are incorporated by reference.

This disclosure is directed to technical improvements in computerized execution control and may be used alone or in combination with other safety, authentication, and governance technologies. Interoperability with other systems is optional and does not limit the scope of the present disclosure.

III. FIELD

The present disclosure relates to computer security and execution control for artificial intelligence (AI) systems, and more particularly to pre-inference enforcement mechanisms that authenticate signal origin, validate runtime behavior against immutable constraints, and obtain distributed authorization before permitting AI execution.

IV. BACKGROUND

AI systems are increasingly deployed in distributed environments, including cloud services, edge devices, and embedded platforms, where execution may be triggered by user signals, device events, or automated workflows. As capability and autonomy increase, unauthorized execution, policy drift, and tampering with execution constraints can result in security failures, regulatory non-compliance, or unsafe outputs.

Conventional access control and post-hoc auditing can be insufficient in settings where an AI system may execute actions or generate outputs before an operator can review the decision path. In addition, reliance on a single authentication factor (e.g., a password or API key) can be vulnerable to compromise, replay, or automated bypass attempts. Likewise, policy enforcement mechanisms that are modifiable at runtime can be subverted by privilege escalation, configuration drift, or self-modifying code.

Accordingly, there is a need for technical mechanisms that (i) bind an execution request to a verifiable origin signal, (ii) validate execution behavior against an immutable constraint representation protected from runtime modification, and (iii) require distributed, cryptographically verifiable authorization before an AI system is permitted to proceed with inference or action.

V. SUMMARY

This disclosure describes systems, methods, and non-transitory computer-readable media for controlling execution of an AI system using a multi-checkpoint ("triune") pre-inference enforcement sequence.

In one implementation, the system receives an origin signal from an interface, generates a Root-Origin Hash Signature (ROHS) digest for the origin signal, and authenticates origin by matching the ROHS digest to a pre-issued Covenant Root Authority (CRA) credential to produce a CRA match result. In some implementations, the origin signal comprises a biometric-origin component produced by a cognitive interface.

The system further validates an execution context associated with an execution request against an Immutable Constraint Chain (ICC) to produce an ICC validation result indicating whether unauthorized execution, execution drift, or logic mutation is detected. The system routes at least the CRA match result and the ICC validation result through GEN Node arbitration to obtain an execution authorization verdict that includes a verdict record cryptographically signed by quorum participants.

Execution is authorized only when the CRA match result indicates success, the ICC validation result indicates no detected violation, and the execution authorization verdict is verified, including verification that the verdict record cryptographically binds to a hash of at least a portion of the execution request or an arbitration request packet derived therefrom. Otherwise, execution is denied prior to inference, and an authorization or denial result is recorded in an Eternal Arbitration Ledger (EAL).

In optional implementations, the ICC is represented as a logic-sealed hash tree stored within an Encrypted Logic Vault (ELV) that is inaccessible to a host runtime; a Distributed Verdict Engine (DVE) produces quorum consensus; a Tier Trust Engine (TTE) assigns trust tiers (e.g., Tier Alpha/Beta/Gamma); jurisdictional fingerprinting and compliance entropy scoring are validated; a Triune Execution Signature (TES) is generated and committed to a Sovereign Signature Log (SSL); and a Recursive Consent Suppression Layer (RCSL) blocks replay and recursive bypass attempts.

In further optional implementations, the origin signal may include a hardware-backed attestation token (e.g., a secure enclave or trusted platform module attestation), and GEN Node arbitration may apply risk-tier or trust-tier dependent quorum thresholds. In further optional implementations, authorization may be bound to a machine-verifiable entitlement token representing a permitted execution scope and may be metered for licensing and accounting purposes. In further optional implementations, EAL entries may be hash-chained and periodically anchored to an external timestamping service or public ledger for independent verification and dispute-resistant auditability.

In further optional implementations, the system generates a machine-verifiable evidence pack derived from ledger and verdict artifacts and enables independent offline verification for procurement, audits, and licensing. In further optional implementations, execution authorization is bound to a policy epoch identifier to detect policy rollback or constraint downgrade attempts, and the system may generate a privacy-preserving compliance proof (e.g., a selective-disclosure signature or zero-knowledge proof) that verifies authorization conditions without revealing protected content. Implementations provide a computing security improvement by preventing unauthorized inference computation and downstream side effects through deny-before-inference interception coupled to cryptographically verifiable provenance, immutable constraint validation, and distributed authorization.

Non-equivocation and conflict proof (optional).
In further optional implementations, the system enforces non-equivocation for at least one tamper-evident log or registry by causing one or more anti-equivocation witnesses to observe and co-sign a registry head record that includes a prev_head commitment. Upon detection of inconsistent head records for a common prev_head commitment (or other inconsistency), the system generates a conflict proof comprising at least two cryptographically verifiable head records evidencing equivocation, and records or packages the conflict proof for independent offline verification.

Incident receipts and response rail (optional).
In further optional implementations, the system generates a signed incident receipt for a detected violation, denial, quarantine, rollback attempt, or other governance event, the incident receipt comprising at least a severity classification, a reason code, an effective time, a scope, and cryptographic bindings to one or more authorization artifacts. In some implementations, incident receipts are propagated across linked deployments and acknowledgments of enforcement are collected and recorded to provide dispute-resistant response evidence.

Evaluation-to-gate binding (optional).
In further optional implementations, authorization is conditioned on satisfaction of one or more evaluation predicates evidenced by a machine-verifiable evaluation receipt bound to a model identifier, release manifest, policy epoch, or combinations thereof. The execution gate denies or quarantines execution when a required evaluation receipt is absent, stale, out-of-scope, revoked, or inconsistent with an attested release state.

Domain container transport preserving canonical bytes (optional).
In further optional implementations, evidence packs, receipts, release manifests, or verifier bundles are transported using a domain container that preserves canonical bytes of signed payloads across heterogeneous transport domains, such that offline verification yields deterministic results independent of container format, archive ordering, or metadata normalization.

Control-point registry and permit semantics (optional).
In further optional implementations, the system binds deny-before-inference enforcement to a declared control point at which execution would otherwise reach inference computation or a downstream side effect. A control point may correspond to, for example, an inference API boundary, model runtime wrapper, tool-invocation boundary, privileged action gate, container entry point, retrieval augmentation boundary, or combinations thereof. In some implementations, a control-point registry defines control_point_id identifiers and associated permit semantics, and the system cryptographically binds at least one of (i) a control_point_id or (ii) a registry snapshot commitment (e.g., control_point_registry_hash) to at least one authorization artifact (e.g., verdict record, evidence pack, or both). The execution gate denies or quarantines execution when a required control_point_id, permit_semantics_id, or registry snapshot commitment is absent, inconsistent, or out-of-scope.

Receipt graph and multi-agent delegation chain (optional).
In further optional implementations, the system generates verifiable receipts for a plurality of related execution requests, including multi-agent subtasks, delegated tool invocations, or chained workflows. In some implementations, each receipt is bound to at least one parent identifier or parent commitment, and a receipt graph commitment (e.g., chain_root_hash) is recorded or packaged such that an offline verifier can validate continuity of the chain, parent-child bindings, and non-cyclic structure without access to runtime systems. In further optional implementations, a policy may require that a specified subset of receipts in a chain satisfy authorization predicates prior to permitting an associated downstream action.

Time-valid credential status proofs (as-of-time) (optional).
In further optional implementations, the system supports long-horizon, offline-verifiable credential status evidence, including validity-window and revocation status "as-of" a specified time. In some implementations, an evidence pack or verifier bundle includes a credential status snapshot comprising an as_of_time, a credential identifier, a validity window (e.g., not_before/not_after), and revocation status evidence (e.g., a revocation registry checkpoint commitment, a transparency log checkpoint commitment, or a signed snapshot hash). An offline verifier can validate that a credential used to verify an authorization artifact was valid as-of-time, even when online status services are unavailable.

VI. BRIEF DESCRIPTION OF DRAWINGS

The accompanying drawings illustrate example implementations of the disclosed subject matter. The drawings are not necessarily to scale.

VII. DETAILED DESCRIPTION OF DRAWINGS

Figure 1:
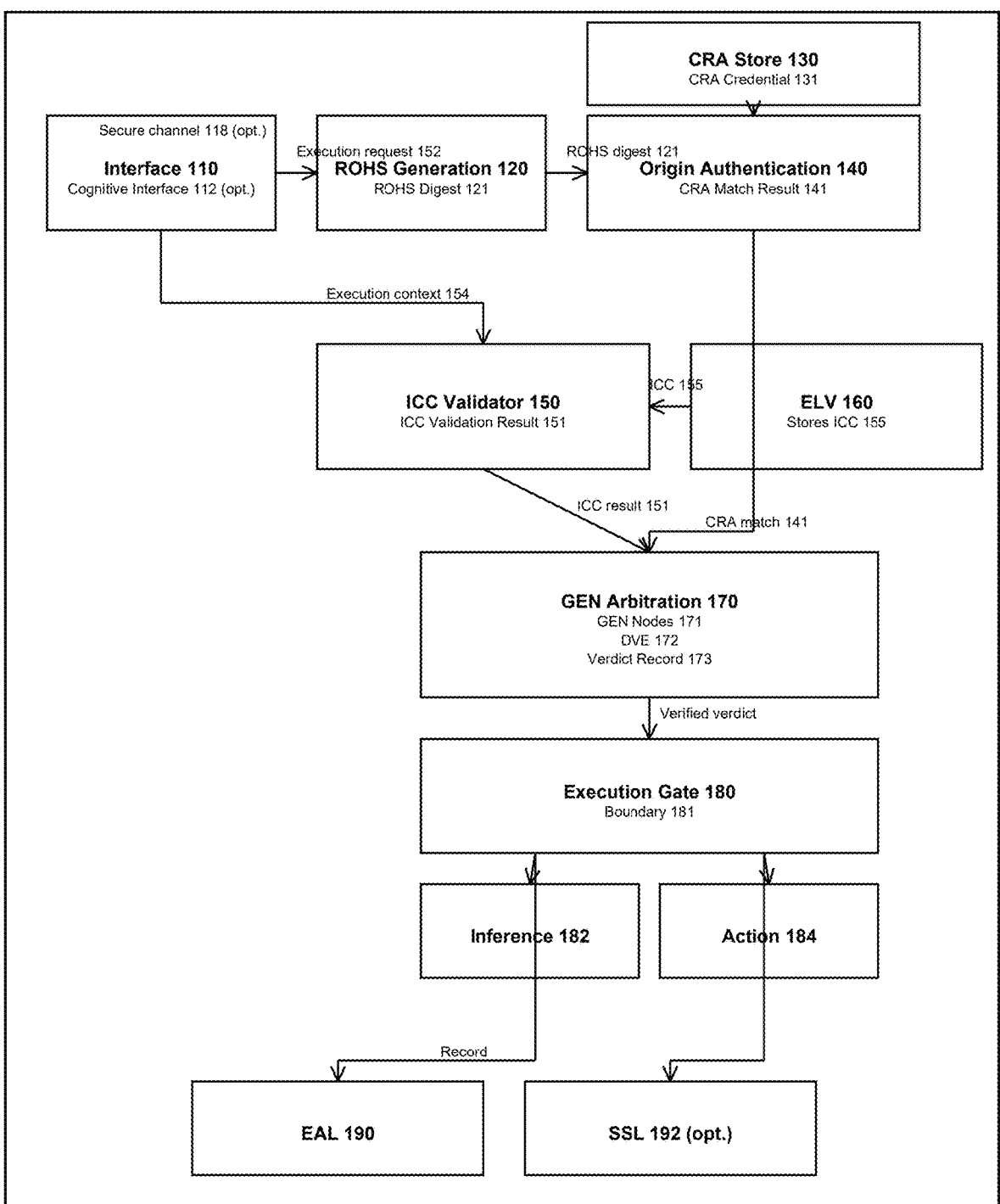
FIG. 1 is a functional block diagram of an example execution compliance system implementing a pre-inference triune enforcement sequence.

FIG. 1 illustrates an example execution compliance system 100 implementing a triune pre-inference execution gate 180, including an interface 110, ROHS generation module 120 producing an ROHS digest 121, CRA credential store 130 and origin authentication module 140 producing a CRA match result 141, ICC validator 150 validating an execution context 154 against an ICC 155 protected by an ELV 160 to produce an ICC validation result 151, GEN Node arbitration components 170-173 producing a quorum-signed verdict record 173, and tamper-evident logging to an EAL 190 and an optional SSL 192.

Figure 2:
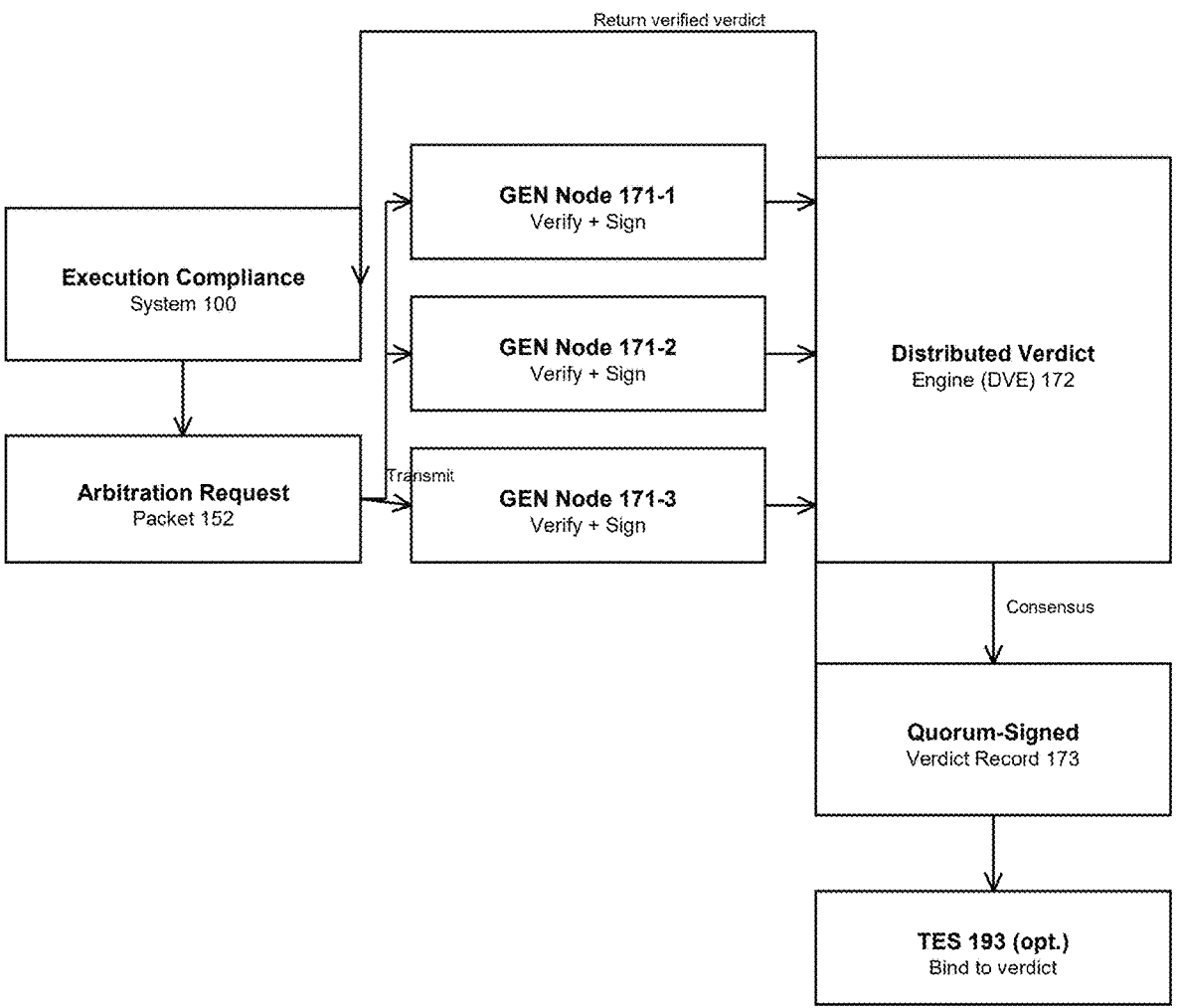
FIG. 2 is a diagram illustrating an example distributed arbitration and verdict signing workflow.

FIG. 2 illustrates an example quorum signature workflow in which quorum participants (e.g., GEN Nodes 171) generate cryptographic signatures that form the verdict record 173, and optionally generate or bind a Triune Execution Signature (TES) 193 to the verdict record 173.

Figure 3:
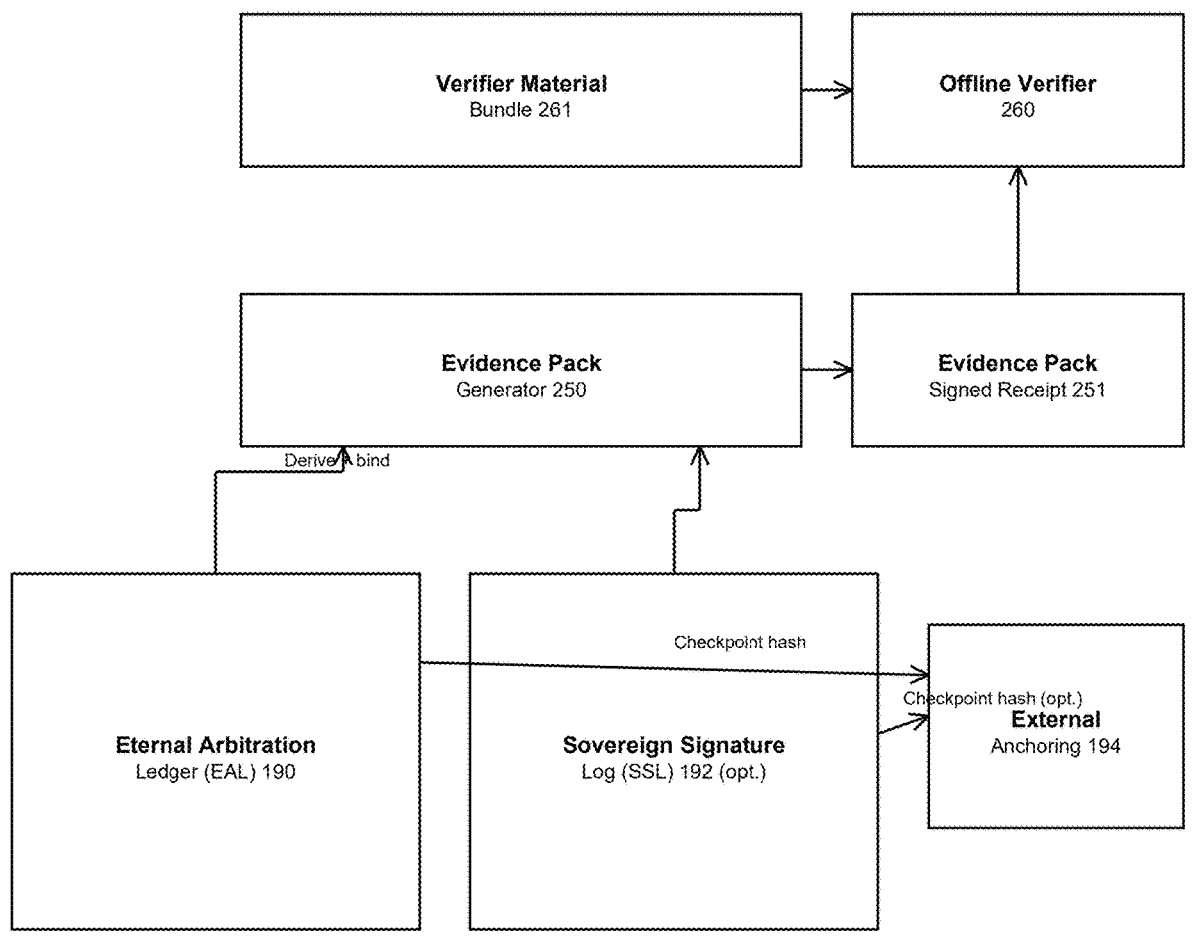
FIG. 3 is a diagram illustrating an example tamper-evident logging architecture with optional external anchoring.

FIG. 3 illustrates an example tamper-evident logging architecture including the EAL 190, the optional SSL 192, and optional external anchoring 194, and further illustrates optional generation of a machine-verifiable evidence pack 251 by an evidence pack generator 250 for independent verification by an offline verifier 260 using verifier material bundle 261.

Figure 4:
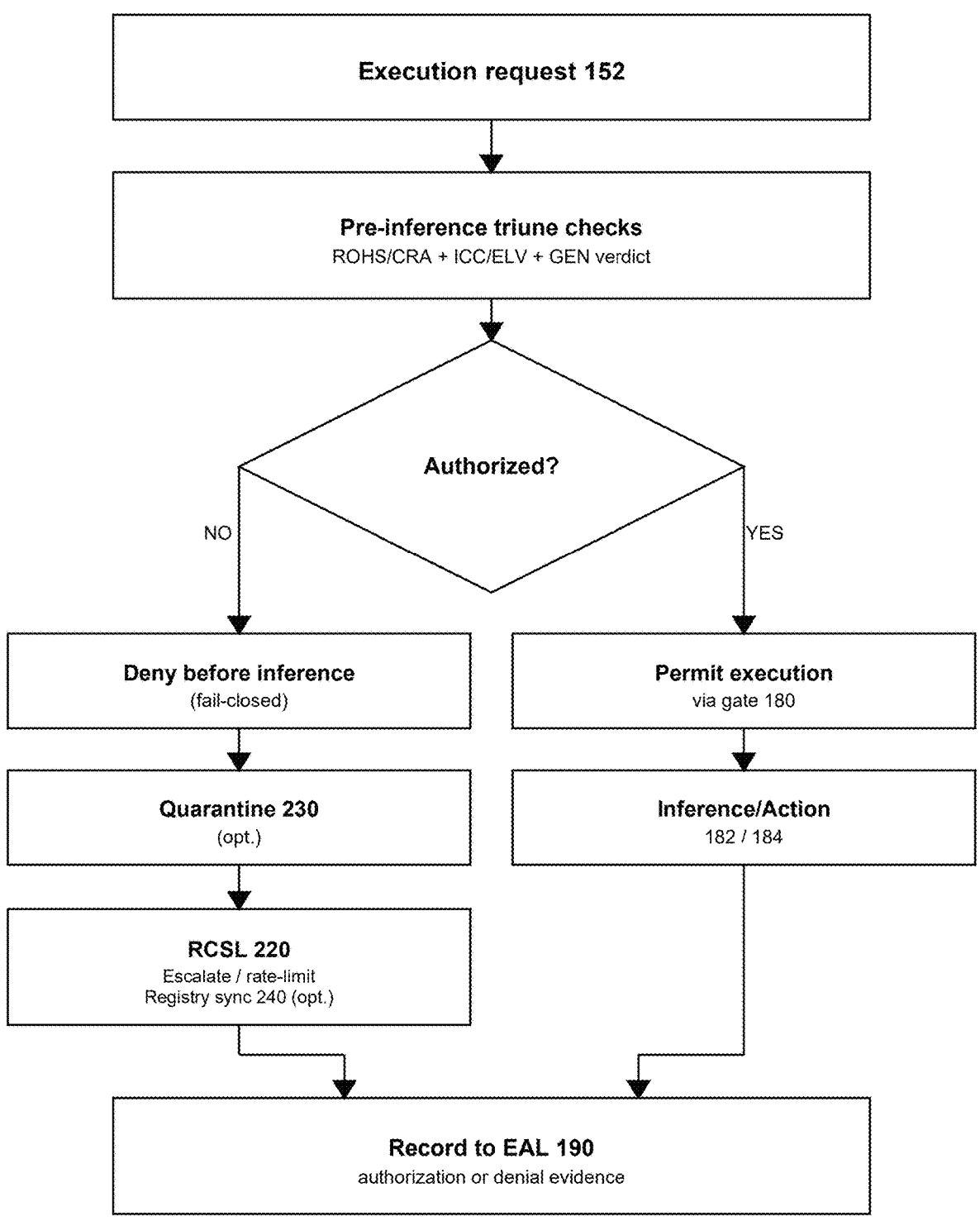
FIG. 4 is a diagram illustrating an example fail-closed and quarantine workflow.

FIG. 4 illustrates an example fail-closed and quarantine workflow in which the execution gate 180 denies execution prior to inference upon detected drift, mutation, override, or authorization failure, optionally storing artifacts in a quarantine store 230, applying RCSL protections 220, and propagating suspension via registry synchronization module 240.

Figure 5:
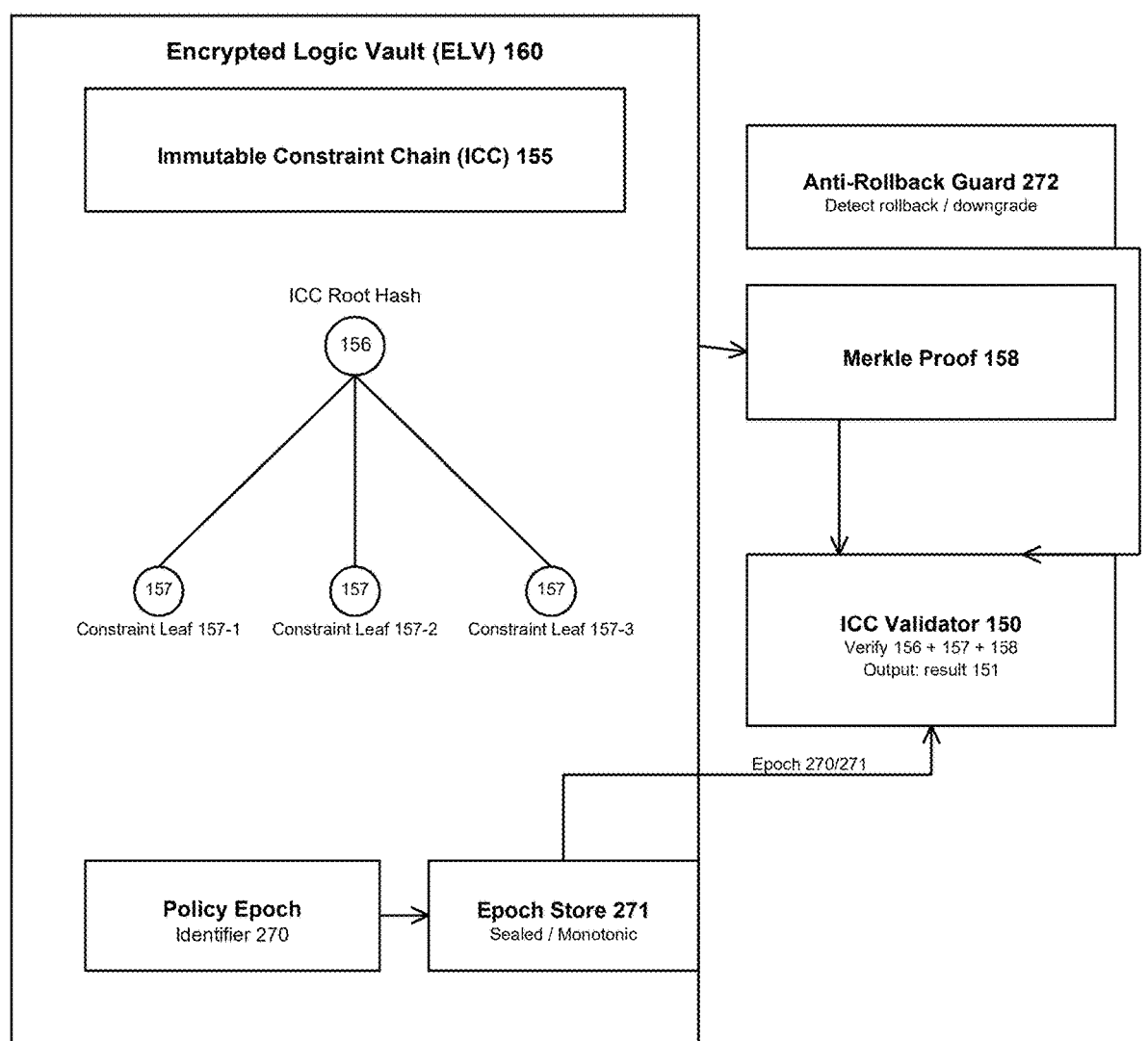
FIG. 5 is a diagram illustrating an example immutable constraint storage and post-deployment lock mechanism.

FIG. 5 illustrates an example post-deployment lock mechanism that prevents runtime modification of the ICC 155 protected within the ELV 160, including verification of an ICC root hash 156, constraint leaves 157, and Merkle proofs 158, and further illustrates binding an ICC state to a policy epoch identifier 270 to detect rollback or downgrade attempts.

Figure 6:
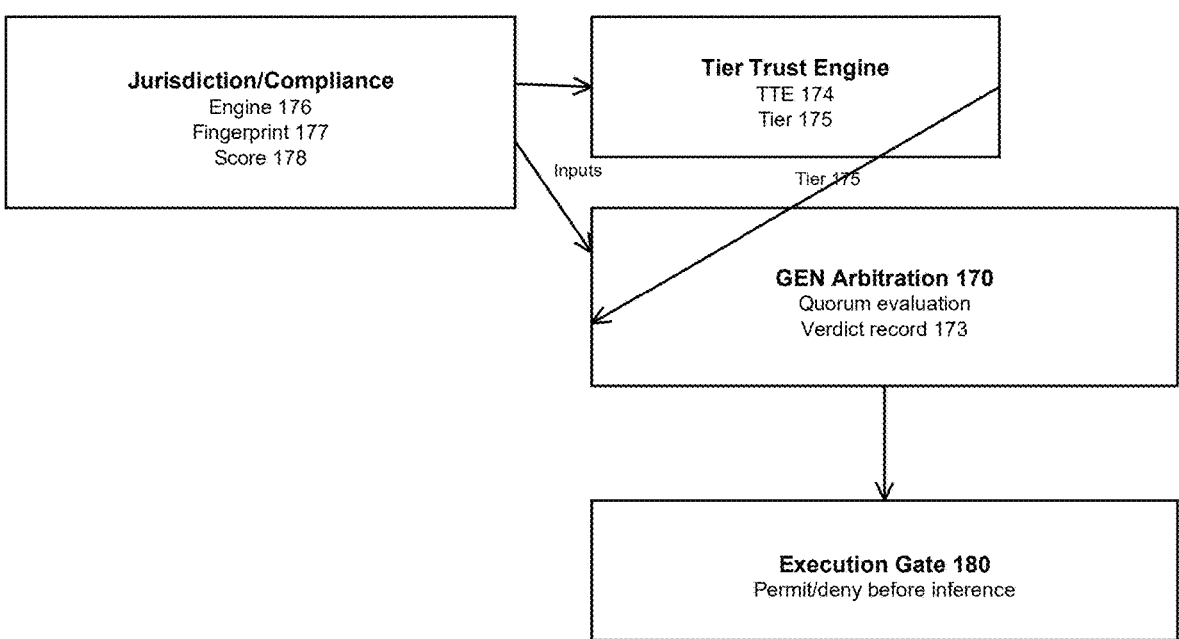
FIG. 6 is a diagram illustrating an example jurisdictional and compliance evaluation workflow.

FIG. 6 illustrates an example jurisdictional and compliance engine 176 that validates a jurisdictional fingerprint 177, a compliance entropy score 178, or both, and optionally incorporates trust tier classification 175 via a Tier Trust Engine (TTE) 174 for distributed arbitration decisions.

Figure 7:
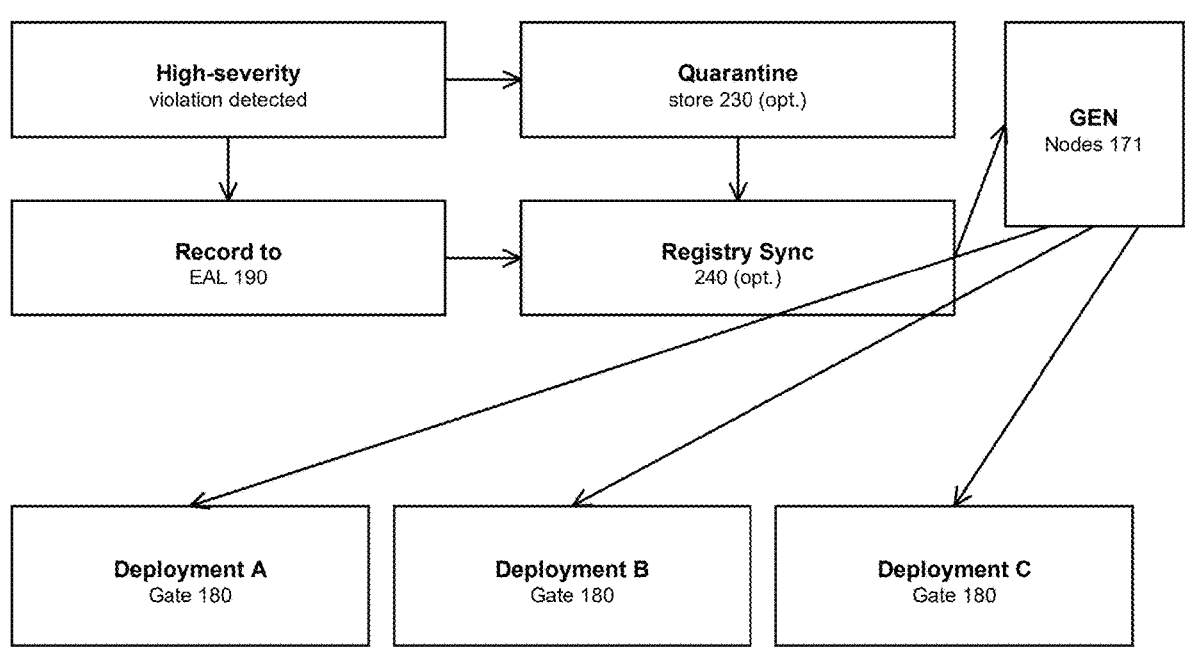
FIG. 7 is a diagram illustrating an example revocation, quarantine, and suspension propagation workflow.

FIG. 7 illustrates an example global quarantine, revocation, and suspension cascade in response to high-severity violations, including propagation of revocation or quarantine updates across deployments using the registry synchronization module 240.

Figure 8:
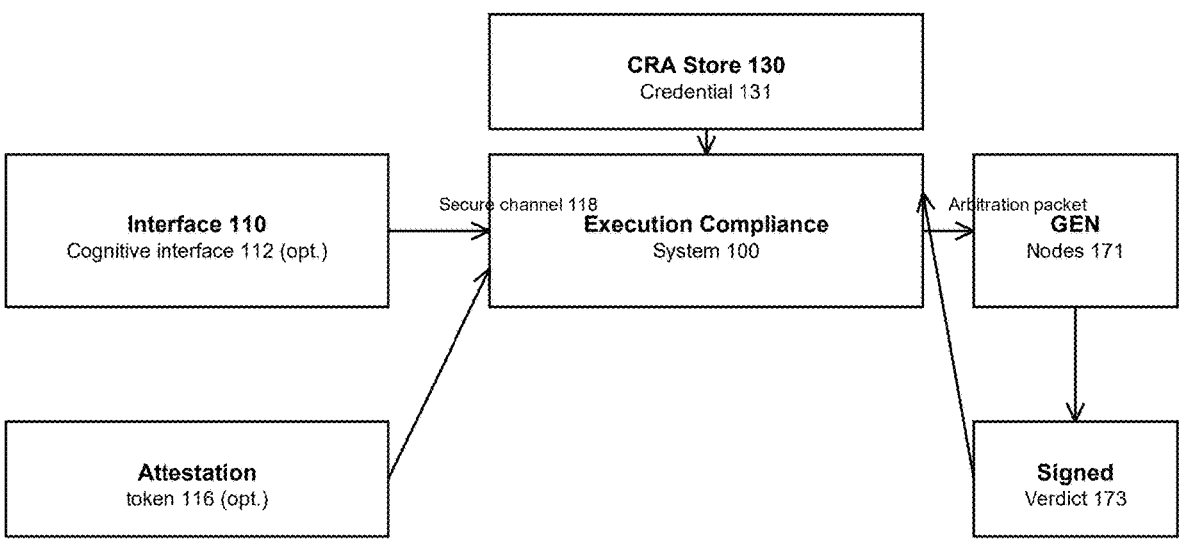
FIG. 8 is a diagram illustrating an example secure channel establishment and key validation workflow.

FIG. 8 illustrates an example secure channel 118 establishment and key validation among multiple authorities for exchanging arbitration packets and verdicts, including optional triad-of-keys validation spanning an interface-associated agent credential, a root authority record, and a GEN Node signature.

Figure 9:
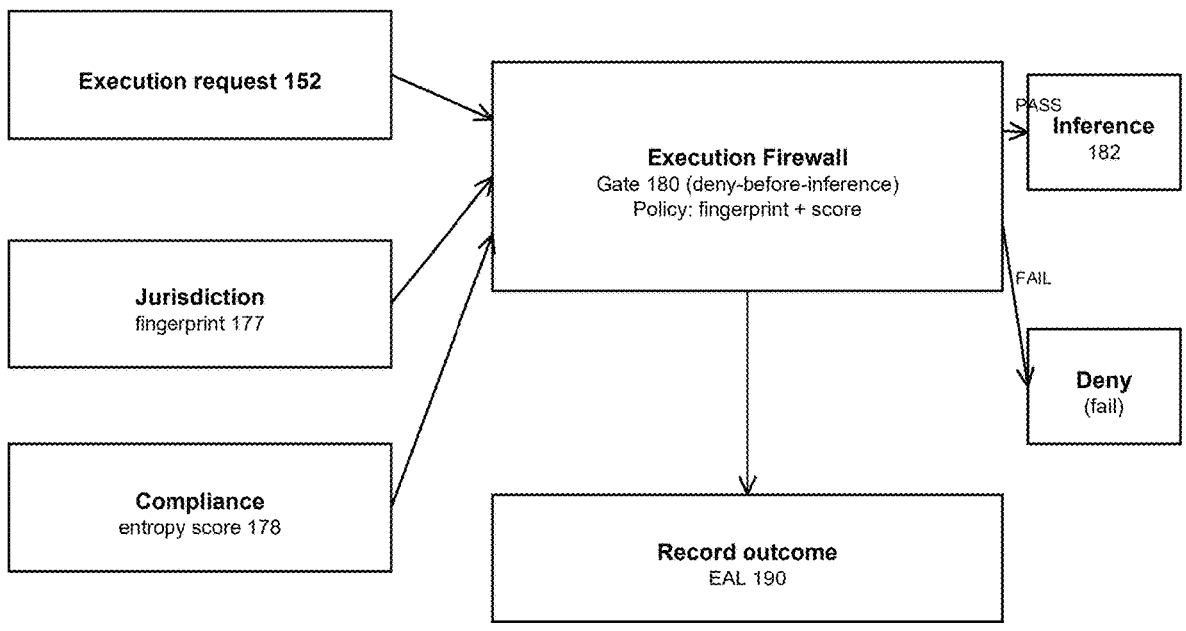
FIG. 9 is a diagram illustrating an example jurisdictional execution firewall for deny-before-inference enforcement.

FIG. 9 illustrates an example jurisdictional execution firewall implemented by the execution gate 180 that restricts execution based on a jurisdictional fingerprint 177, a compliance entropy score 178, or both.

Figure 10:
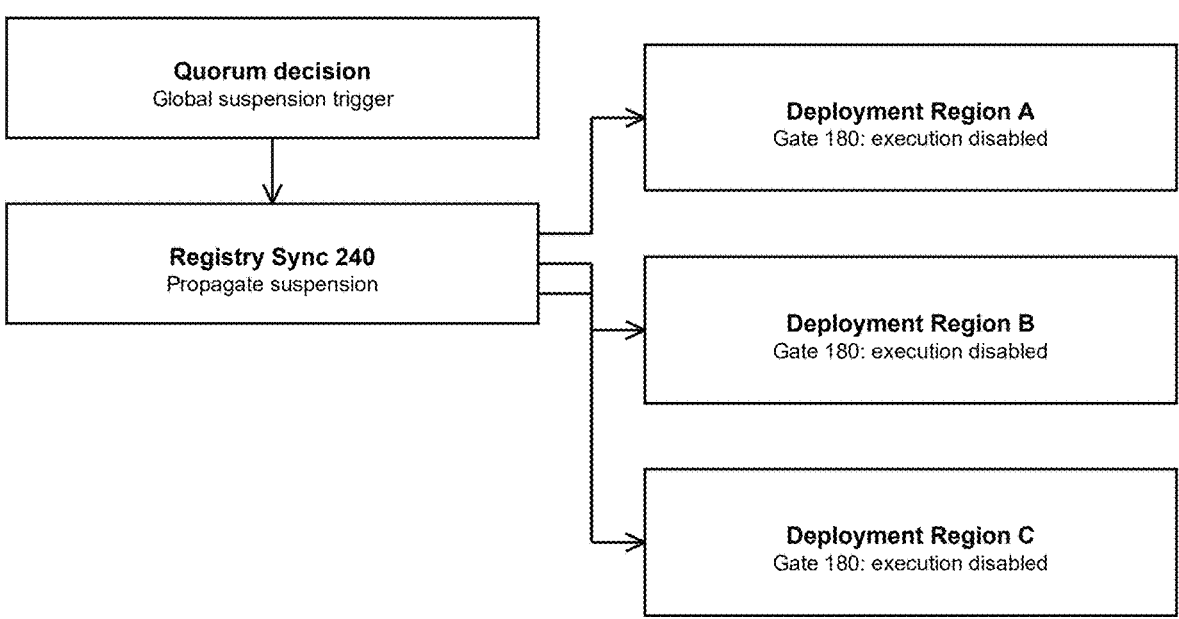
FIG. 10 is a diagram illustrating an example global suspension protocol across linked deployments.

FIG. 10 illustrates an example global termination or suspension protocol that propagates revocation and disables execution across linked deployments via registry synchronization 240.

Figure 11:
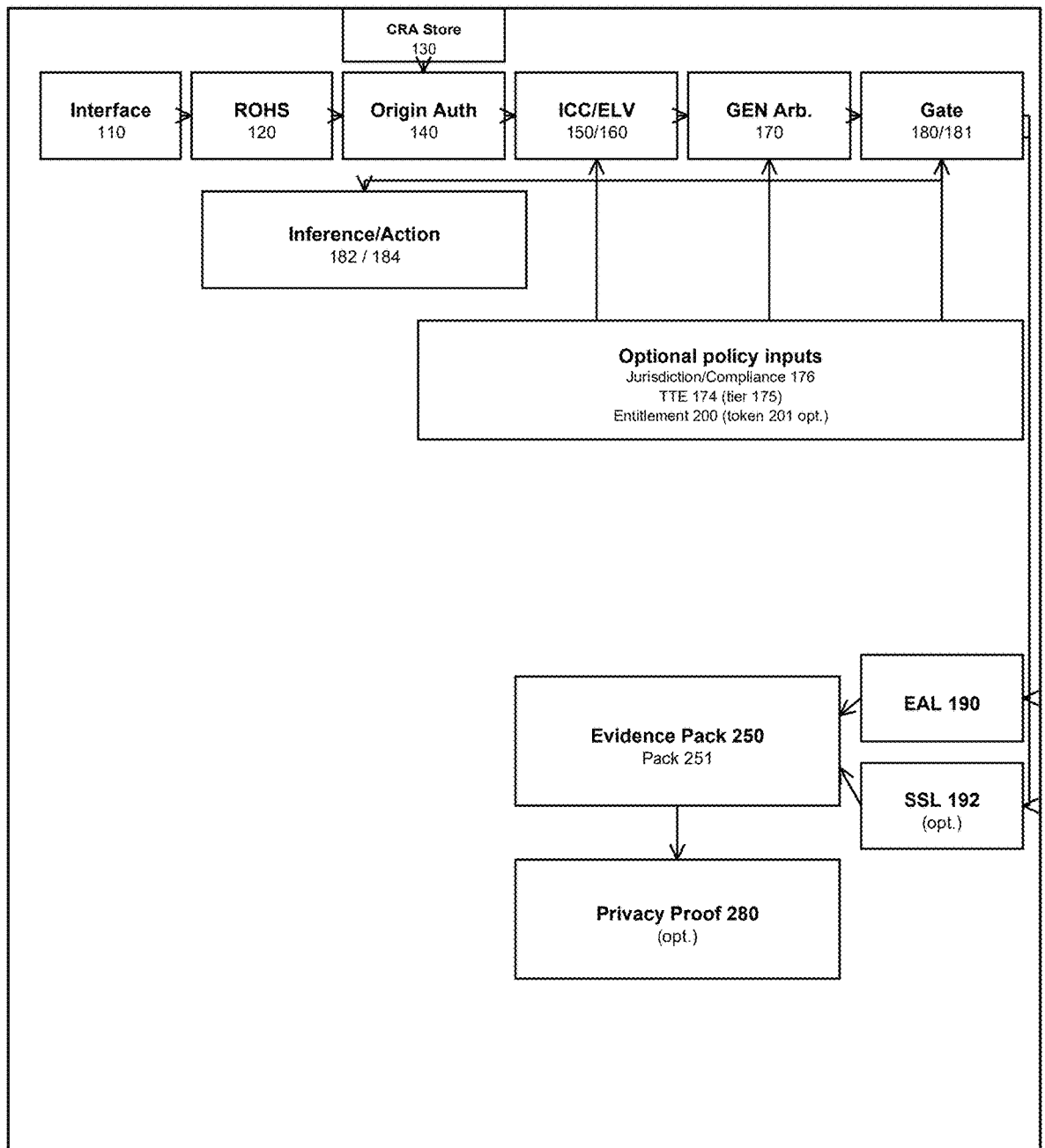
FIG. 11 is an integrated architecture diagram illustrating example relationships among origin authentication, constraint validation, distributed arbitration, and logging.

FIG. 11 illustrates an integrated architecture showing example relationships among origin signal capture, ROHS/ CRA origin authentication, ICC/ELV constraint validation, distributed arbitration, optional entitlement and metering, and EAL/SSL logging.

Figure 12:
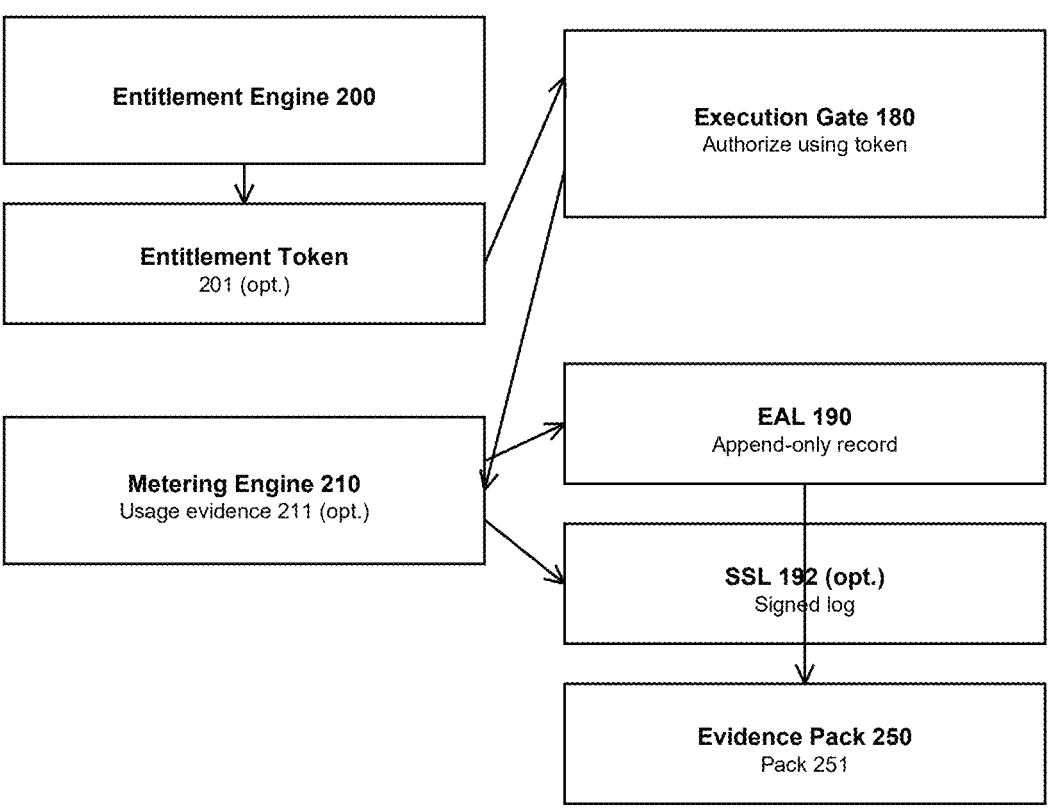
FIG. 12 is a diagram illustrating an example entitlement and metering subsystem for licensing and accounting.

FIG. 12 illustrates an example enforcement and accounting subsystem including entitlement engine 200 issuing or validating an entitlement token 201 and metering engine 210 recording usage metering evidence 211, and further illustrates optionally including licensing and accounting fields within an evidence pack 251.

Figure 13:
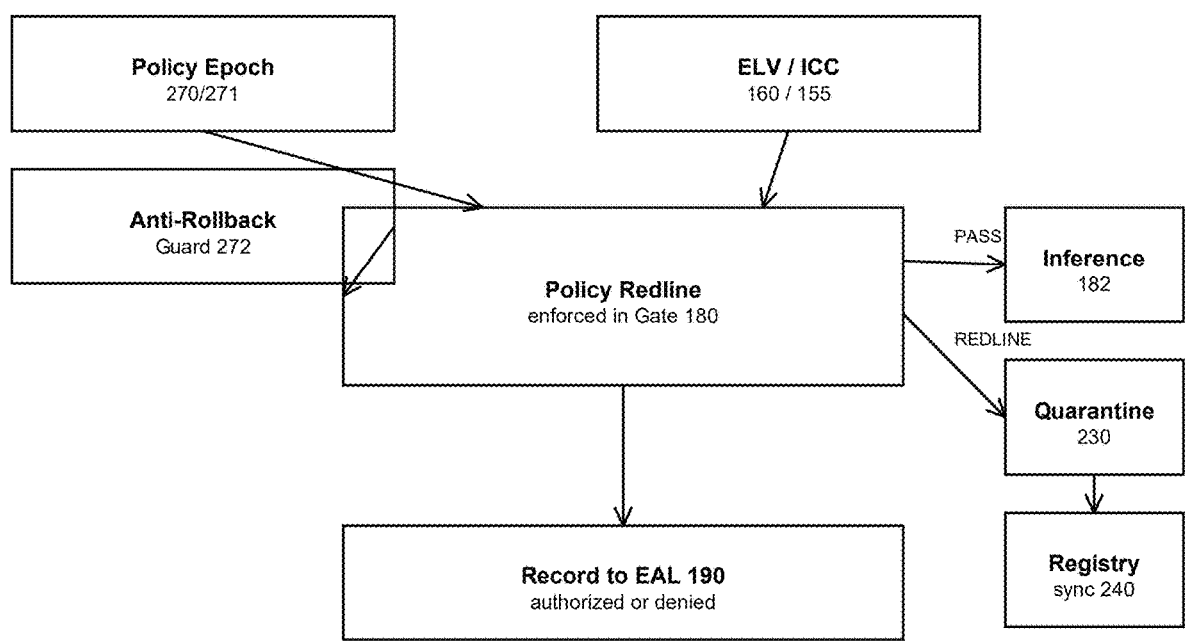
FIG. 13 is a diagram illustrating an example policy redline enforcement gateway with escalation and lockout.

FIG. 13 illustrates an example policy redline enforcement gateway in which prohibited behaviors trigger escalation and irreversible lockout enforced prior to inference, wherein the lockout state is stored in at least one of the EAL 190, the ELV 160, or a revocation registry synchronized across linked deployments, and further illustrates optional anti-rollback guarding using a policy epoch identifier 270 and an anti-rollback guard 272.

Figure 14:
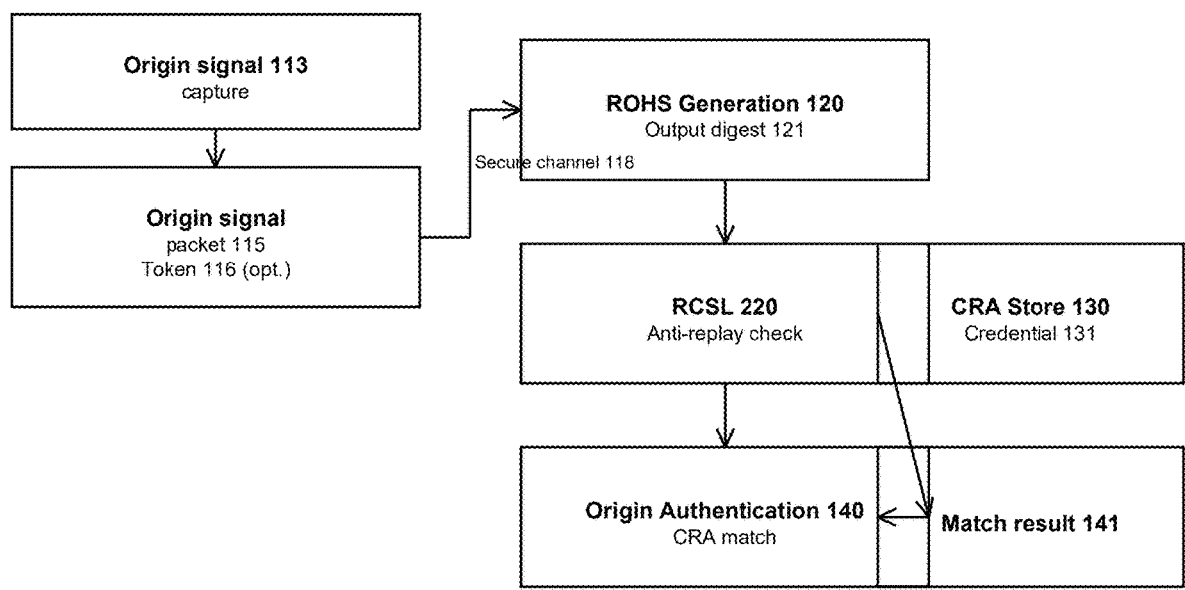
FIG. 14 is a diagram illustrating an example origin-signal processing flow including ROHS generation and anti-replay defenses.

FIG. 14 illustrates an example origin signal 113 capture and ROHS generation flow including entropy feature extraction, anti-replay protections, and optional interface attestation using an origin signal packet 115, attestation token 116, and RCSL 220.

Figure 15:
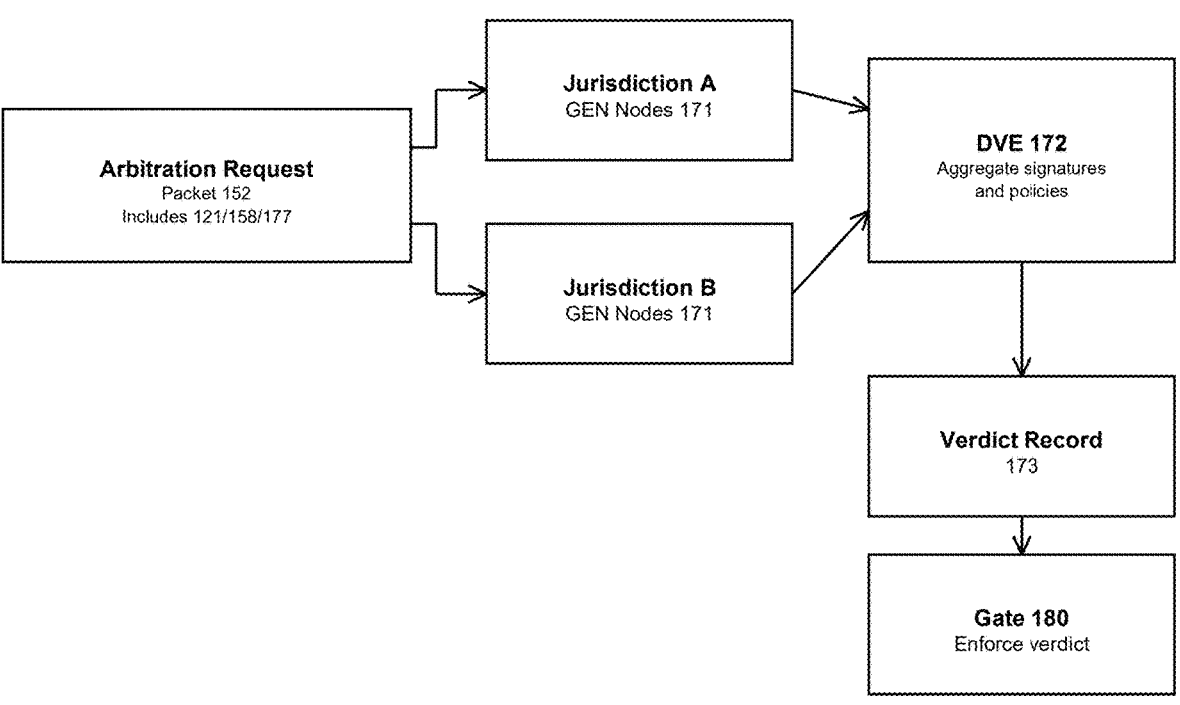
FIG. 15 is a diagram illustrating an example multi-jurisdiction arbitration workflow including quorum consensus generation.

FIG. 15 illustrates an example distributed arbitration workflow including quorum evaluation, consensus generation using a DVE 172, verdict signing to produce verdict record 173, and optional inclusion of policy epoch bindings and jurisdictional attributes in arbitration packets.

Figure 16:
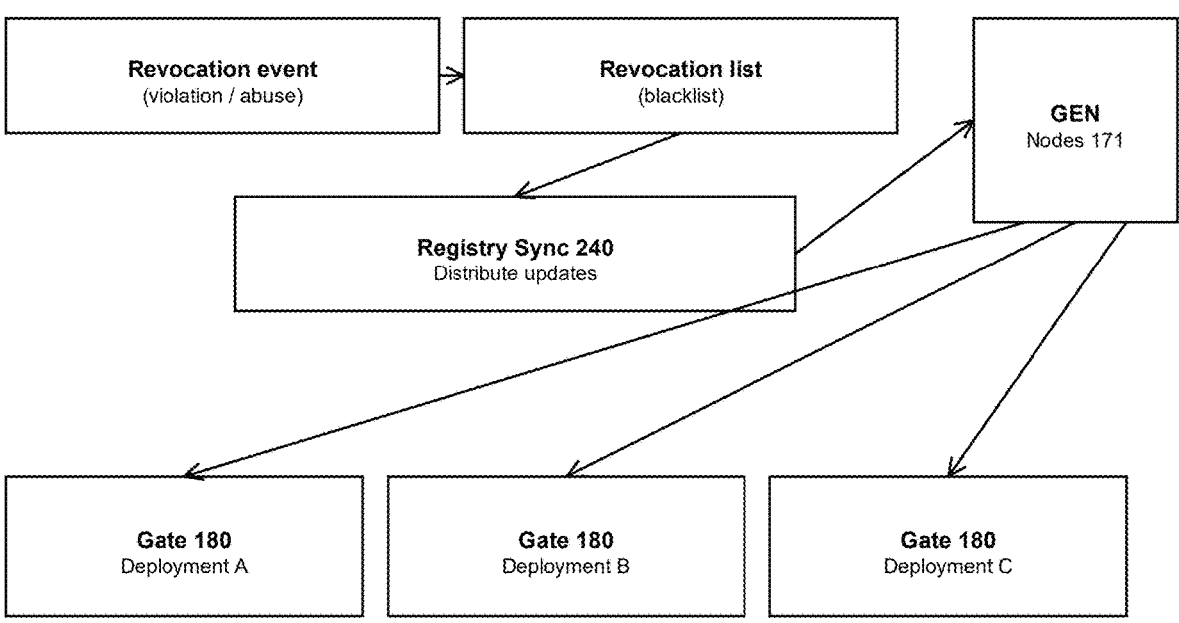
FIG. 16 is a diagram illustrating an example blacklist, revocation, and registry synchronization mechanism.

FIG. 16 illustrates an example blacklist, revocation, and dissemination mechanism among cooperating registries or nodes, including propagation of suspension state updates.

Figure 17:
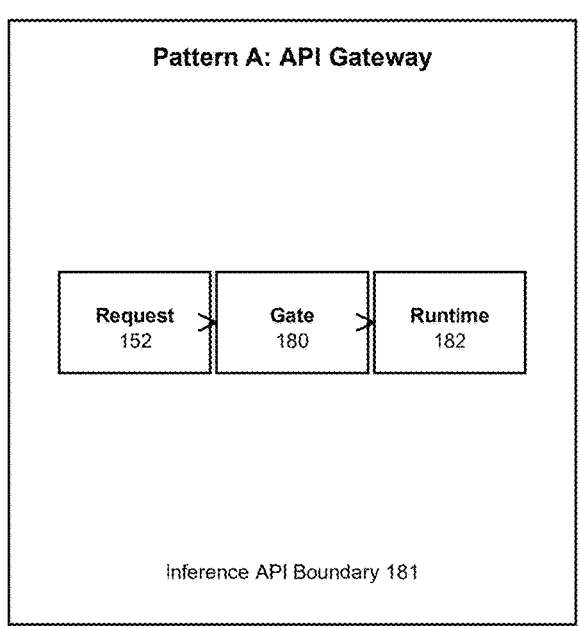
FIG. 17 is a diagram illustrating example deployment integration patterns at one or more enforcement boundaries.
Figure 17:
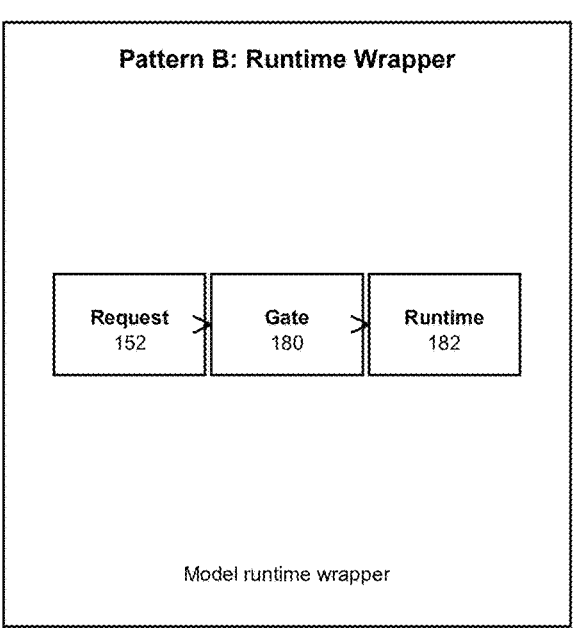
Figure 17:
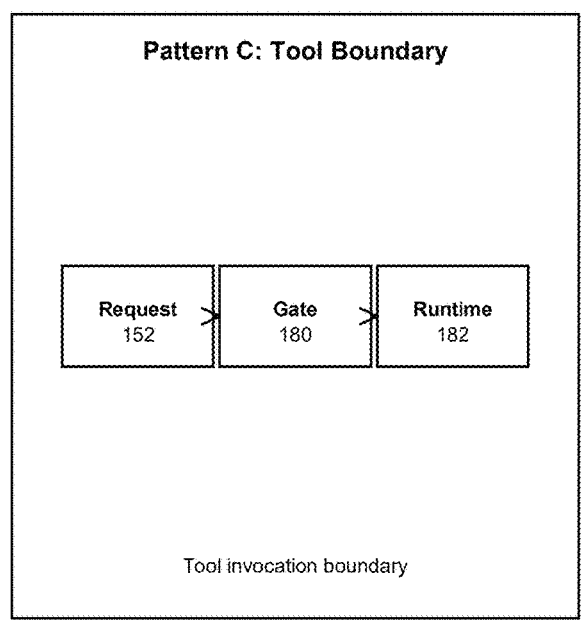
Figure 17:
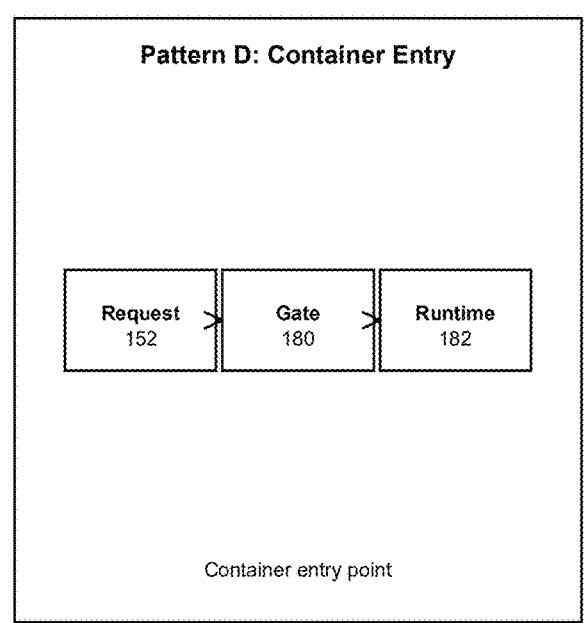

FIG. 17 illustrates non-limiting deployment integration patterns in which the execution gate 180 is integrated at one or more enforcement boundaries, including an inference API boundary 181, a model runtime wrapper, a tool-invocation boundary, or a container entry point.

VIII. DETAILED DESCRIPTION

The following description is presented to enable a person skilled in the art to make and use the disclosed subject matter. Various modifications to the described implementations will be apparent, and the principles described herein may be applied to other implementations without departing from the scope of the claims. Accordingly, the disclosed subject matter is not limited to the implementations described, but is to be accorded the widest scope consistent with the principles and features disclosed herein.

Overview. In various implementations, an execution compliance system 100 enforces a pre-inference "triune" authorization sequence in which (1) origin provenance of an execution request 152 is authenticated, (2) runtime behavior or execution context 154 is validated against an immutable constraint representation protected from runtime modification, and (3) a distributed set of authorization nodes produces a cryptographically verifiable execution authorization verdict. The execution request 152 is permitted to reach an inference API boundary 181 and an AI inference engine 182 (or a downstream action executor 184) only after the triune sequence succeeds; otherwise, the request is denied before inference by an execution gate 180 and logged immutably (e.g., to an Eternal Arbitration Ledger (EAL) 190). In some implementations, origin provenance includes biometric-origin data captured by a cognitive interface 112; in other implementations, origin provenance includes non-biometric origin evidence, such as device attestation or cryptographic tokens. As used herein, "deny-before-inference" includes denying prior to any inference computation, token generation, embedding computation, retrieval augmentation step, tool invocation, or other external side effects attributable to the requested execution. In some implementations, the triune sequence further includes verification of an execution-scope artifact prior to permitting the requested execution, where the execution-scope artifact comprises at least one of an entitlement token, a capability token, a human-oversight token, or combinations thereof, and the execution gate 180 enforces fail-closed denial prior to inference or prior to a downstream action when the execution-scope artifact is absent, expired, revoked, out-of-scope, or otherwise invalid.

Example system components (non-limiting). FIGS. 1 and 11 depict an example deployment in which an execution compliance system 100 includes: (i) an interface 110 (including, in some implementations, a cognitive interface 112); (ii) signal processing and ROHS generation logic, such as a ROHS generation module 120 that outputs an ROHS digest 121; (iii) a CRA credential store 130 storing CRA credentials 131 and an origin authentication module 140 that outputs a CRA match result 141; (iv) an ICC validator 150 configured to validate an execution context 154 against an Immutable Constraint Chain (ICC) 155 protected by an Encrypted Logic Vault (ELV) 160, and to output an ICC validation result 151 and, optionally, a Merkle proof 158 binding a constraint leaf 157 to an ICC root hash 156; (v) a GEN Node arbitration interface 170 coupled to quorum participants (GEN Nodes) 171 and an optional Distributed Verdict Engine (DVE) 172 that outputs a quorum-signed verdict record 173; (vi) an execution gate 180 that enforces deny-before-inference at one or more execution boundaries (e.g., inference API boundary 181); and (vii) one or more tamper-evident logs including an Eternal Arbitration Ledger (EAL) 190 and an optional Sovereign Signature Log (SSL) 192. Optional modules may include an entitlement engine 200 (issuing or validating entitlement tokens 201), a usage metering engine 210 (recording usage metering evidence 211), a jurisdiction/compliance engine 176 (computing jurisdictional fingerprints 177, compliance entropy scores 178, or both), a Tier Trust Engine (TTE) 174 (providing trust tier classifications 175), a Recursive Consent Suppression Layer (RCSL) 220, a quarantine store 230, a registry synchronization module 240, and external anchoring 194.

Interface and origin signal. An "interface" 110 refers to any device, sensor array, software-assisted capture system, API gateway, or attestation service configured to acquire or generate origin evidence from a user or an authorized source and output an origin signal suitable for authentication and provenance purposes. In some implementations, the interface 110 comprises a cognitive interface 112 configured to acquire biometric data (e.g., neural sensors such as EEG, EMG sensors, heart-rate or PPG sensors, voiceprint sensors, keystroke dynamics sensors, gaze or facial motion sensors, or multi-modal combinations thereof) and output a biometric-origin component of the origin signal. The interface 110 may be local to the execution compliance system 100 or remote and connected via a network.

In some implementations, the interface 110 packages an origin signal as a signal packet 115 including: (i) sensor-derived data or extracted features; (ii) an interface identifier; (iii) a timestamp; (iv) a nonce or sequence number; and (v) optional device attestation data (e.g., a secure enclave attestation token 116). The signal packet 115 can be transmitted over a secure channel 118 to the execution compliance system 100 for processing. The signal packet format is further described below and illustratively summarized in Appendix I.

Hardware attestation (optional). In some implementations, the signal packet 115 includes a hardware-backed attestation token 116 generated by a secure element (e.g., secure enclave, trusted execution environment, HSM, or TPM). The execution compliance system 100 can verify the hardware-backed attestation token 116 using verification material referenced by, or bound to, the CRA credential 131. This binds the origin signal to a specific measured device state and reduces the feasibility of device emulation, virtualization attacks, or token replay across devices.

ROHS generation. In response to receiving an origin signal (e.g., within the signal packet 115), the system 100 generates a Root-Origin Hash Signature (ROHS) using ROHS generation module 120 to produce an ROHS digest 121. The ROHS digest 121 is a cryptographic digest that binds at least a representation of the origin signal to provenance metadata such as identity, time of origin, entropy features, or combinations thereof. In some implementations, ROHS generation includes extracting one or more entropy-related features (e.g., Shannon entropy over a feature vector, spectral entropy, sample entropy, or other statistical descriptors) from the signal or from derived features.

In one example (non-limiting), the system computes $ROHS\_digest=H\ (ID\|DEV\|TS\|E\|N)$, where H is a cryptographic hash function, ID is an identity or credential identifier, DEV is a device or interface identifier, TS is a timestamp, E represents one or more entropy features, and N is a nonce or sequence number. The exact composition and ordering may vary. In another example, the system uses a keyed hash (e.g., HMAC) with a key derived from a credential, a vault-protected secret, or a secure enclave.

Uniqueness. Consistent with claim implementations, the ROHS digest 121 can be generated to be unique to at least (i) an identity, (ii) a time of origin, and (iii) a behavioral entropy pattern associated with the origin signal. Uniqueness may be supported by inclusion of timestamps, nonces, per-session salts, or biometric feature variability, and by rejecting replays of previously observed digests (see RCSL 220 below).

CRA credential and origin authentication. The system 100 authenticates origin of the origin signal by matching the ROHS digest 121 to a pre-issued Covenant Root Authority (CRA) credential 131 (e.g., retrieved from CRA credential store 130) to produce a CRA match result 141, such as via origin authentication module 140. In this disclosure, a CRA credential 131 is a root authorization credential that binds an authorized identity, an authorized device, or both to cryptographic verification material and policy attributes. A CRA credential 131 may be implemented, for example, as a certificate, a signed token, a public-key record, a secure-enclave provisioned credential, or a ledger-anchored credential record.

Matching (examples). Matching the ROHS digest 121 to a CRA credential 131 may include, for example: (i) verifying a digital signature over the ROHS digest 121 using verification material indicated by the CRA credential 131; (ii) verifying that the ROHS digest 121 satisfies a credential-defined format and is associated with an unrevoked credential identifier; (iii) verifying freshness using TS and N and rejecting stale or replayed digests; and, in some implementations, (iv) comparing entropy-related features to a licensed entropy baseline associated with the CRA credential 131 (e.g., an enrollment baseline range). The CRA match result 141 may be a boolean, a score, or a structured result including a match identifier, confidence score, revocation status, or both.

Licensed entropy baseline (optional). In some implementations, the CRA credential 131 includes or references a licensed entropy baseline, such as a baseline entropy range, a statistical profile, or a baseline feature distribution associated with an authorized identity, an authorized interface, or both. The system 100 can confirm the CRA match result 141 against the licensed entropy baseline to reduce spoofing, synthetic signal generation, or device emulation.

ICC validation. The system 100 validates an execution context 154 associated with an execution request 152 against an Immutable Constraint Chain (ICC) 155 to produce an ICC validation result 151 indicating whether an unauthorized execution, an execution drift, or a logic mutation is detected. The execution context 154 may include one or more of: a targeted action type; a requested tool invocation; a model configuration or weights identifier; a prompt or policy context; code modules to be executed; a container image digest; a decision policy identifier; or other execution-relevant context.

ICC representation (example). In some implementations, the ICC 155 comprises a logic-sealed hash tree or Merkle structure defining permissible execution behaviors, encrypted and sealed at system deployment. For example, each constraint leaf 157 may represent a permitted policy rule, permitted action class, permitted tool capability, or permitted code measurement; internal nodes may store hashes of child nodes, and a root hash 156 may represent the deployed policy state. ICC validation may include verifying that current execution behavior matches one or more permitted leaves 157 or permitted paths, and may further include verifying Merkle proofs 158 against a stored root hash 156.

Policy epoch binding and anti-rollback (optional). In some implementations, the ICC 155 and its root hash 156 are bound to a policy epoch identifier 270 representing a version, epoch, or monotonic counter for an active constraint state. The policy epoch identifier 270 may be stored in an epoch store 271 protected by the ELV 160 and may be included in an arbitration request packet, in the verdict record 173, or both. The execution compliance system 100 may detect a policy rollback or downgrade attempt when a received policy epoch identifier 270 is non-monotonic relative to a previously accepted policy epoch identifier, relative to a sealed monotonic counter, or relative to an anchored checkpoint in the EAL 190. Upon detecting a policy rollback, an anti-rollback guard 272 may deny execution prior to inference, record a denial reason in the EAL 190, and optionally trigger quarantine or suspension propagation via registry synchronization module 240. Non-limiting examples of epoch binding are described in Appendix P.

Merkle proof binding (optional). In some implementations, ICC validation includes generating or verifying a Merkle proof 158 that binds a constraint leaf 157 (or a permitted execution path) to an ICC root hash 156 stored and sealed within the ELV 160. A quorum participant (e.g., a GEN Node 171), a verifier, or both can verify the Merkle proof 158 to confirm that the evaluated constraint is derived from the deployed ICC state, without exposing the full constraint set to an untrusted runtime.

Encrypted Logic Vault (ELV). In some implementations, the ICC 155 is stored within an Encrypted Logic Vault (ELV) 160 that is inaccessible to a host runtime. The ELV 160 may be implemented using hardware-backed isolation (e.g., trusted execution environment), sealed storage, or access controls that prevent modification by untrusted runtime code. The system 100 denies runtime override attempts to modify the ICC 155 and can log override attempts to the EAL 190. FIG. 5 illustrates one example ELV arrangement.

ICC validation result. The ICC validation result 151 may include: a pass/fail indicator; one or more drift or mutation scores; a description of a violated constraint; an identifier of a constraint leaf 157 or policy rule; and optionally attestation evidence. In some implementations, the ICC validation result 151 indicates whether unauthorized execution, execution drift (e.g., deviation from expected behavioral policy), or logic mutation (e.g., unexpected code or configuration changes) is detected.

GEN Node arbitration. The system 100 routes at least the CRA match result 141 and the ICC validation result 151 through GEN Node arbitration (e.g., via GEN Node arbitration interface 170) to obtain an execution authorization verdict that includes a verdict record 173 cryptographically signed by quorum participants (e.g., GEN Nodes 171). Each GEN Node 171 may execute verification logic, policy checks, and trust evaluation independently, and a Distributed Verdict Engine (DVE) 172 may aggregate evaluations, signatures, or both into a verifiable verdict record 173.

Arbitration request packet. In some implementations, the system 100 creates an arbitration request packet including: (i) the ROHS digest 121 or ROHS hash; (ii) the CRA match result 141 and optionally a CRA credential identifier; (iii) the ICC validation result 151 and optionally ICC proof evidence (e.g., Merkle proof 158); (iv) optionally a jurisdictional fingerprint 177, a compliance entropy score 178, or both; (v) a requested execution type; and (vi) a unique request identifier. The arbitration request packet is transmitted to a set of GEN Nodes 171 over authenticated channels (e.g., secure channel 118). In some implementations, the arbitration request packet further includes one or more participant-selection parameters that specify required participant classes or administrative domains (e.g., provider, customer/tenant, auditor, or regulator), separation-of-duties constraints, or both, and the system selects a set of GEN Nodes 171 dynamically based on the participant-selection parameters and at least one of a requested execution type, risk classification, trust tier classification, jurisdictional classification, or combinations thereof.

Quorum and consensus (DVE). In some implementations, quorum nodes (GEN Nodes 171) analyze the arbitration request packet independently and reach consensus through the Distributed Verdict Engine (DVE) 172. The DVE 172 may implement threshold signing, Byzantine fault-tolerant consensus, or other quorum mechanisms. The execution authorization verdict may include a verdict record 173 cryptographically signed by quorum participants (e.g., individual signatures, aggregated signatures, or a threshold signature).

Verdict verification. The execution compliance system 100 verifies the execution authorization verdict by verifying that the verdict record 173 is signed by at least a threshold number of quorum participants (e.g., GEN Nodes 171) and that the verdict is associated with the arbitration request packet (e.g., by including a hash of the arbitration request packet in a signed payload of the verdict record 173).

Tier Trust Engine (TTE) and trust tiers. In some implementations, the execution authorization verdict includes a trust tier classification 175 validated by a Tier Trust Engine (TTE) 174. The trust tier classification 175 may include at least one of Tier Alpha, Tier Beta, or Tier Gamma. A trust tier may control execution privileges, escalation requirements, rate limits, or quarantine policies. Appendix H provides an illustrative tier description; the description is non-limiting.

Risk-adaptive quorum thresholds (optional). In some implementations, the trust tier classification 175, a risk classification, or both for a requested execution type controls a quorum threshold for producing the verdict record 173 (e.g., higher threshold for high-risk actions, lower threshold for low-risk read-only actions). The quorum threshold can be implemented using multi-signature aggregation, threshold signatures, or other cryptographically verifiable quorum mechanisms. In some implementations, the quorum threshold is policy-driven such that different threshold rules are applied for different execution types, tool/action classes, data scopes, or jurisdictions, and in some implementations the quorum threshold includes per-class constraints requiring at least one signature from each of two or more distinct administrative domains.

The TTE 174 may compute the trust tier classification 175 using one or more inputs such as compliance history, violation rate, credential status, device attestation status, drift metrics, jurisdictional rules, or both. The trust tier classification 175 may be included in the signed verdict record 173 to bind the tier decision to the authorization outcome.

Jurisdictional fingerprint and compliance entropy score. In some implementations, a jurisdiction/compliance engine 176 validates a jurisdictional fingerprint 177, a compliance entropy score 178, or both before authorizing execution, and denies execution prior to inference when the jurisdictional fingerprint 177 fails to satisfy a machine-readable permitted jurisdictional profile or when the compliance entropy score 178 fails a threshold. A jurisdictional fingerprint 177 can include, for example, a measured region identifier, a regulatory domain identifier, an organization identifier, a deployment boundary measurement, or other environment attributes. A compliance entropy score 178 can include a computed metric indicating deviation from permitted behavior or compliance expectations, derived from EAL 190 history, ICC 155 drift metrics, or other telemetry. In some implementations, the permitted jurisdictional profile is stored in the ICC 155, referenced by an entitlement token 201, stored in a policy store accessible to the jurisdiction/compliance engine 176 or quorum participants, or combinations thereof. As used herein, a permitted jurisdictional profile refers to a machine-readable set of allowed jurisdictional attributes or constraints against which the jurisdictional fingerprint 177 is compared, and may include region identifiers, regulatory domain identifiers, deployment boundary measurements, organization identifiers, or combinations thereof.

In one example, the jurisdictional fingerprint 177 is derived from a combination of cloud region, network attestation, device attestation, and licensed deployment identifiers. In another example, the compliance entropy score 178 is computed from a weighted combination of policy violation counts, recency-weighted drift scores, trust tier transitions, or combinations thereof. The validation outcome can be included in the arbitration request packet, recorded in the EAL 190, or both.

Pre-inference enforcement. The execution compliance system 100 enforces a deny-before-inference policy by placing an execution gate 180 in the execution path. The execution gate 180 may be integrated at an inference API boundary 181, at a model runtime wrapper, at a tool-invocation boundary, at a container entry point, or at another execution boundary. The execution gate 180 prevents an inference operation from being performed by an AI inference engine 182 until the triune sequence succeeds. In some implementations, the execution gate 180 prevents not only inference token generation, but also any preparatory inference computation (e.g., prefill, embedding, or retrieval-related model calls) and any downstream tool/action side effects until the triune sequence succeeds.

Authorization conditions. In implementations consistent with claim 1, the system 100 authorizes execution only when: (i) the CRA match result 141 indicates success; (ii) the ICC validation result 151 indicates no detected violation; and (iii) the execution authorization verdict is verified (e.g., via verification of verdict record 173). Otherwise, the system 100 denies execution prior to inference by the execution gate 180. Denial can include blocking the request, returning an error or denial response, and optionally quarantining the request and associated artifacts (e.g., into quarantine store 230).

Evaluation predicates bound to authorization (optional). In some implementations, the execution gate enforces one or more evaluation predicates prior to permitting execution. An evaluation predicate may require, for example, that a specified evaluation suite identifier, a capability assessment, a safety-case assertion, or combinations thereof are satisfied for a given model identifier, release_manifest_hash, policy_epoch_id, jurisdictional profile, or execution type. In some implementations, satisfaction is evidenced by an evaluation receipt comprising: eval_suite_id; subject_id (e.g., model_weights_digest or container_image_digest); eval_results_commitment; evaluator_id; timestamp; scope; and signature, and the evaluation receipt is referenced by, or included in, an evidence pack. The gate denies or quarantines execution when a required evaluation receipt is missing, expired, revoked, inconsistent with an attested release state, or out-of-scope for the requested execution type.

Eternal Arbitration Ledger (EAL). The system 100 records an authorization or denial result in an Eternal Arbitration Ledger (EAL) 190. The EAL 190 is a tamper-evident, append-only log (or log set) suitable for auditing and distributed verification. The EAL 190 may be implemented using, for example, a blockchain, an append-only journal with hash chaining, a write-once storage medium, or a replicated log with integrity protections.

External anchoring (optional). In some implementations, the EAL 190 is implemented as a hash-chained append-only log (or replicated log) and is periodically anchored to an external timestamping service or public ledger via external anchoring 194 by committing an anchor value (e.g., a root hash or checkpoint hash). External anchoring enables independent verification of log integrity across time and reduces repudiation risk in licensing, compliance, and incident response contexts.

EAL record content (example). In some implementations, recording in the EAL 190 includes storing an immutable record that includes at least: (i) an ROHS hash (e.g., ROHS digest 121); (ii) a timestamp; (iii) a CRA match identifier; (iv) a trust tier (e.g., trust tier classification 175); (v) a signature hash comprising at least one of (A) a Triune Execution Signature (TES) hash or (B) a verdict record hash; and (vi) a GEN Node approval flag. Additional fields may include an ICC validation identifier, a jurisdictional fingerprint hash, and, when denied, a denial reason code and signature material references. Appendix I illustrates an example stage-by-stage flow, and Appendix H provides an illustrative tier description; these appendices are non-limiting.

Triune Execution Signature (TES) and Sovereign Signature Log (SSL). In some implementations, the system 100 generates a Triune Execution Signature (TES) 193 composed of: (i) an ROHS hash, (ii) a CRA credential tag, and (iii) a GEN Node sovereign license key. The system 100 may commit the TES 193 to a Sovereign Signature Log (SSL) 192 including a timestamp and a licensing match key. The SSL 192 may be implemented as a separate append-only log or as a logically separated namespace within the EAL 190.

Non-equivocation witnesses and conflict proofs (optional).

In some implementations, the system maintains, or interoperates with, a registry (or log set) that publishes a head record representing a latest accepted state. A head record may include at least: head_id; prev_head_hash; checkpoint_hash (e.g., EAL checkpoint or release_manifest_hash); timestamp; signer_id; and signature. One or more anti-equivocation witness entities observe head publication and produce witness signatures over the head record (or over a canonical commitment thereto).

If the system, a witness, or an offline verifier observes two head records that are both cryptographically valid yet inconsistent under a defined consistency rule (e.g., sharing a prev_head_hash but diverging in checkpoint_hash), the system constructs a conflict proof that includes at least the inconsistent head records and corresponding signatures, enabling a third party to verify equivocation without requiring access to the runtime.

Entitlement, metering, and licensing evidence (optional).

In some implementations, the execution compliance system 100 issues or validates an entitlement token 201 via an entitlement engine 200, the entitlement token 201 being bound to a CRA match identifier and a permitted execution scope (e.g., permitted action class, permitted tool set, permitted model configuration, a jurisdictional boundary, or combinations thereof). The system 100 can record usage metering evidence 211 via a metering engine 210 to at least one of the EAL 190 or SSL 192. Such metering evidence can support pay-per-use licensing, post-deployment audits, and automated suspension or renewal workflows. In some implementations, the entitlement token 201 is implemented as, or includes, a capability token encoding a permitted tool set, a permitted action class, a permitted downstream action type, a permitted model or configuration identifier, a permitted data scope, rate limits, usage quotas, permitted policy epoch ranges, jurisdiction boundaries, or combinations thereof. In some implementations, for a high-risk execution type or privileged downstream action, authorization further requires validation of a human-oversight token that is cryptographically bound to at least a request identifier and a permitted scope and is time-bounded. In some implementations, the metering engine 210 generates a signed metering receipt derived from usage metering evidence 211 and at least one authorization artifact (e.g., ROHS hash, ICC root hash, verdict record hash, or policy epoch identifier) such that an independent verifier can validate licensing/accounting compliance without accessing the runtime. In some implementations, entitlement tokens, capability tokens, or human-oversight tokens are revoked or suspended via a revocation registry synchronized across linked deployments.

Evidence pack generation and offline verification (optional). In some implementations, after an authorization or denial outcome, an evidence pack generator 250 constructs a machine-verifiable evidence pack 251 derived from one or more records in the EAL 190 or SSL 192 and from the verdict record 173. The evidence pack 251 may be cryptographically signed using an evidence-pack signing key 252 and stored in an evidence pack store 253 for later audit, dispute resolution, procurement acceptance testing, or licensing verification. In one non-limiting example, the evidence pack 251 includes at least: request_id; timestamp; interface_id; ROHS hash; CRA credential identifier; CRA match result; ICC root hash; execution context hash; verdict record hash; quorum signature set (or threshold signature); denial reason code (if denied); and an anchoring checkpoint (if used). Additional non-limiting fields may include a policy epoch identifier 270, Merkle proof 158, jurisdictional fingerprint hash 177, compliance entropy score 178, entitlement token identifier 201, and usage metering evidence 211. In some implementations, the evidence pack 251 includes a schema_version identifier and algorithm identifiers indicating at least one of (i) a canonicalization procedure, (ii) a hash function, (iii) a signature scheme, or (iv) an anchoring scheme, to support deterministic verification. In some implementations, the evidence pack 251 includes a key identifier, a certificate chain reference, a certificate_chain_hash, or revocation status evidence (e.g., an OCSP/CRL snapshot hash or revocation registry checkpoint) to support long-term verification after key rotation, key revocation, or partial disclosure. In some implementations, the evidence pack 251 includes or references one or more additional receipts or records, including a signed metering receipt, a signed suspension update, or a verified human-oversight token.

In some implementations, an independent verifier computing system, referred to as an offline verifier 260, verifies the evidence pack 251 without accessing the execution compliance system 100. The offline verifier 260 may verify (i) integrity of disclosed fields by checking hashes and signatures, (ii) authenticity by validating the evidence pack signature using verifier materials 261 (e.g., public keys or certificates), (iii) quorum authorization by validating the verdict record 173 signatures or threshold signature, and (iv) log ordering by validating an anchoring checkpoint or hash-chain continuity. The offline verifier 260 may produce a pass/fail report usable as a procurement artifact or an audit exhibit. Non-limiting example procedures and field sets are described in Appendix O and Appendix R. In some implementations, the offline verifier 260 produces a machine-readable verification log that identifies each verified predicate, each algorithm identifier used, and pass/fail outcomes, and optionally includes recomputed commitments for disclosed fields.

Domain container transport preserving canonical bytes (optional).

In some implementations, artifacts subject to offline verification (e.g., evidence packs, receipts, verifier bundles, release manifests) are transported in one or more domain containers (e.g., archives, object stores, content-addressed bundles, or container images) while preserving canonical bytes of signed payloads. Canonical bytes preservation may include deterministic canonicalization, deterministic ordering, metadata normalization rules, or combinations thereof, such that a verifier reconstructs the same canonical payload bytes for signature verification regardless of transport domain. In some implementations, the domain container includes a manifest that commits to payload digests and canonicalization identifiers, enabling deterministic reconstruction by an offline verifier.

Selective disclosure and privacy-preserving compliance proof (optional). In some implementations, a privacy proof generator 280 produces a privacy-preserving compliance proof that enables a third-party verifier to confirm that authorization conditions were satisfied without revealing protected content. For example, the privacy proof generator 280 may output at least one of a selective-disclosure signature 281 over the evidence pack 251 or a zero-knowledge proof 282 that proves satisfaction of one or more authorization predicates (e.g., valid CRA match result, ICC root binding, policy epoch non-rollback, and verified quorum-signed verdict record) while withholding at least one of (i) content of the origin signal, (ii) content of the execution context 154, or (iii) unrevealed portions of the ICC 155. Verification may be performed by a proof verification module 283 according to a disclosure policy 284. Non-limiting examples are described in Appendix Q.

Triad-of-keys signature validation (optional). In some implementations, execution signatures are validated by a triad of keys comprising an interface-associated agent credential, a root authority record, and a GEN Node signature. For example, an interface-associated agent credential may correspond to a credential associated with the cognitive interface 112 or authorized user; the root authority record may correspond to the CRA credential 131; and the GEN Node signature may correspond to a quorum-signed verdict record 173 or a GEN Node license key. Triad validation may be used to reduce single-point compromise and to bind authorization to multiple independent trust domains.

Fail-closed handling and quarantine. In some implementations, the system 100 applies fail-closed handling such that: (i) when ROHS authentication fails, the execution request 152 is denied and flagged; (ii) when a license is expired or revoked, a request is quarantined (e.g., stored in quarantine store 230); and (iii) when verification of at least one cryptographic signature associated with the execution authorization verdict fails, re-arbitration is triggered. Fail-closed behavior can also be applied when system components are unavailable or when integrity checks cannot be completed within required timing constraints.

Quarantine may include storing request artifacts (e.g., the arbitration request packet, ROHS digest 121, and associated telemetry) in an isolated store, applying rate limits, and requiring additional authorization or review before future execution attempts.

Recursive Consent Suppression Layer (RCSL). In some implementations, the system 100 includes a Recursive Consent Suppression Layer (RCSL) 220 configured to block recursive trust spoofing, origin signal re-use, or both associated with bypass attempts. RCSL 220 may implement one or more of: replay detection (e.g., rejection of repeated ROHS digests 121 or repeated nonces); mimicry or pattern detection applied to repeated authorization attempts; cooldown and backoff policies; and evidence capture for denial logging.

For example, RCSL 220 may maintain a rolling window or bloom filter of recently observed ROHS digests 121, enforce monotonic sequence numbers, require per-request freshness proofs, or both. When bypass behavior is detected, the system 100 can deny the request 152 prior to inference and record the denial reason in the EAL 190.

Enrollment and provisioning (optional). In some implementations, a CRA credential 131 is issued during an enrollment process in which an authorized identity, an authorized interface, or both 110 (including, in some cases, a cognitive interface 112) is registered. Enrollment may include collecting baseline signal features, establishing an entropy baseline, binding a device attestation key, and issuing a credential record signed by a root authority. Credential revocation may be propagated to GEN Nodes 171 and recorded in the EAL 190, such that subsequent requests using a revoked credential are denied, quarantined, or both.

Registry synchronization and suspension propagation (optional). In some implementations, revocation, quarantine, or suspension states are propagated across linked deployments using a registry synchronization module 240. For example, upon a severity condition (e.g., repeated denials, verified tampering, or credential revocation), a suspension update can be published to distributed registries or GEN Nodes 171 such that subsequent execution requests 152 associated with the suspended identity or device are denied prior to inference across multiple environments. In some implementations, the suspension update is cryptographically signed and includes at least one of a subject identifier, a suspension scope, a reason code, an effective time, an expiration time, and a monotonic suspension sequence or epoch, and each linked deployment verifies the signature and monotonicity prior to enforcing a lockout state. Distribution may be performed via one or more of a deny list, a revocation registry, a certificate revocation list (CRL), a gossip-based synchronization protocol, or combinations thereof. In some implementations, one or more linked deployments return acknowledgments of enforcement, and the acknowledgments or corresponding hashes are recorded in the EAL 190.

Signed incident receipts and response acknowledgments (optional). In some implementations, upon a governance event (e.g., denial, quarantine, rollback detection, tampering evidence, repeated bypass attempts, or credential revocation), the system generates a signed incident receipt. A non-limiting incident receipt may include: incident_id; severity; reason_code; subject_id; scope; effective_time; expiration_time (optional); incident_epoch or monotonic sequence; bindings to one or more of rohs_hash, icc_root_hash, policy_epoch_id, verdict_record_hash, or anchoring_checkpoint; and a digital signature. In some implementations, incident receipts are propagated via registry synchronization to linked deployments, and linked deployments return enforcement acknowledgments that are cryptographically verifiable and include at least an enforced_scope and a monotonic enforcement sequence. The system records acknowledgments or corresponding hashes in the EAL to provide dispute-resistant evidence of response execution.

Example computing environment. The described modules may be implemented in hardware, software, firmware, or combinations thereof. In one example, a computing device 300 implementing the execution compliance system 100 includes one or more processors 302, non-transitory memory 304, a network interface 306, and secure key storage 308 (e.g., HSM/TEE-backed). The AI system may be local or remote (e.g., a cloud-hosted inference engine 182). The execution gate 180 may be implemented as a middleware component, an API gateway, a model runtime wrapper, a kernel module, a hypervisor module, or a secure enclave service, and may intercept requests at an inference API boundary 181, tool boundaries, action boundaries, or combinations thereof.

Technical advantages (non-limiting). Compared to conventional post-hoc auditing, implementations described herein can provide: (i) deny-before-inference enforcement via execution gate 180; (ii) cryptographically verifiable signal provenance via ROHS generation module 120 and CRA credential matching (e.g., CRA credential 131 and origin authentication module 140); (iii) tamper-resistant constraint validation via ICC validator 150, ICC 155, and ELV 160; (iv) distributed authorization and resilience via GEN Node arbitration (e.g., GEN Nodes 171, DVE 172, verdict record 173) and optional trust tiering (e.g., TTE 174); and (v) tamper-evident logging via EAL 190 and SSL 192 with optional external anchoring 194. These advantages improve the security and integrity of computerized AI execution workflows.

IX. INDUSTRIAL APPLICABILITY AND EXAMPLE USE CASES

The disclosed systems and methods are applicable to execution control and security for AI systems deployed in, for example, cloud inference services, agentic tool-use systems, edge AI deployments, enterprise AI gateways, and regulated environments where provenance, policy integrity, and auditable authorization are required.

Non-limiting example use cases include: (i) controlling execution of an AI agent that can invoke external tools or actuators; (ii) enforcing immutable compliance constraints on a model runtime configuration in regulated industries; (iii) requiring distributed approval for high-risk actions (e.g., data exfiltration, privileged system changes, or financial transaction initiation); (iv) preventing replay of previously authorized origin signals; and (v) providing tamper-evident audit trails for regulators or internal governance. Additional non-limiting use cases include generation of procurement-ready evidence packs for independent verification, detection of policy rollback attempts via policy epoch binding, and generation of privacy-preserving compliance proofs for regulators or third-party auditors. Non-limiting additional use cases include: (vi) requiring, for a privileged tool invocation or other high-risk downstream action, a human-oversight token or break-glass approval token that is verified and logged prior to execution; and (vii) supporting cross-organization joint approval using multi-stakeholder councils where at least one authorization participant is operated by an external organization.

X. DEFINITIONS AND TERMINOLOGY

The following definitions are provided to improve clarity and are not intended to limit claim scope. As used herein, "execution drift" refers to deviation of an execution context, runtime behavior, or tool/action invocation from permissible behaviors represented by the ICC, including deviation detected by mismatch of a constraint leaf, drift score threshold exceedance, or policy-scope inconsistency. As used herein, "logic mutation" refers to an unexpected change in measured code, configuration, container image digest, model identifier, weights identifier, tool binding, or policy bundle relative to an ICC-bound baseline, including changes indicative of tampering, self-modification, or unauthorized updates. As used herein, "arbitration request packet" refers to a machine-readable request artifact transmitted to quorum participants, comprising at least cryptographic commitments to origin authentication results and constraint-validation results and a request identifier.

"Artificial intelligence (AI) system" refers to a computer-implemented system that performs inference, prediction, classification, generation, or decision assistance using one or more machine learning models, rules, or combinations thereof. An AI system may include an inference engine, one or more models, and supporting software for input processing and output generation.

"Origin signal" refers to data derived from one or more origin sources associated with an authorized entity or environment and used to bind provenance and freshness to an execution request. An origin signal may include, for example, biometric sensor data or extracted biometric features, device attestation tokens, secure hardware measurements, behavioral dynamics features, signed authorization tokens (including verifiable credentials, decentralized identifier (DID) attestations, or signed session keys), or multimodal combinations thereof. In some implementations, an origin signal comprises biometric neural input (e.g., EEG-derived features).

"Interface" refers to a device, service, or capture system configured to acquire or generate origin evidence and provide an origin signal to the execution compliance system. A "cognitive interface" is one example interface configured to acquire biometric data and provide a biometric-origin component of the origin signal. A cognitive interface does not require, and is not limited to, interpretation of human thoughts; it may be used for authentication and provenance binding based on sensor-derived features. Biometric-origin components are used for authentication and provenance binding and do not require decoding semantic thought content.

"Root-Origin Hash Signature (ROHS)" refers to a cryptographic digest or other cryptographic commitment value derived from an origin signal and metadata (e.g., identity, timestamp, entropy features, nonce) and used to bind provenance and freshness information to an execution request. Non-limiting examples of a ROHS include a hash digest, a keyed hash (e.g., HMAC), a digital signature over a digest, a signature-over-message, or other commitment derivations.

"Covenant Root Authority (CRA) credential" refers to a root authorization credential used to authenticate origin of an origin signal. A CRA credential may be implemented as a certificate, signed token, public-key record, secure enclave credential, a verifiable credential or decentralized identifier (DID) record, a consortium key-registry entry, a ledger-anchored credential record, or other cryptographic credential record.

"Immutable Constraint Chain (ICC)" refers to a representation of permissible execution behaviors and constraints that is protected from unauthorized modification. An ICC may be implemented as a logic-sealed hash tree, a policy Merkle structure, an append-only constraint log, a signed policy bundle, a measured-and-sealed policy-as-code module, a capability token allowlist, or another tamper-evident constraint representation.

"Encrypted Logic Vault (ELV)" refers to a protected storage and processing environment (e.g., encrypted storage, secure enclave, or isolated service) that stores at least the ICC or ICC roots and prevents host runtime modification.

"GEN Node" refers to an authorization node in a distributed arbitration network that evaluates an execution request and participates in generating a signed verdict record. "GEN Node arbitration" refers to obtaining an execution authorization verdict from such nodes. In some implementations, a quorum includes one or more GEN Nodes, and a quorum threshold may be selected based on risk, trust tier, execution type, or combinations thereof; in some implementations, a quorum threshold of one is permitted for low-risk or read-only execution types. GEN Nodes may be operated by distinct administrative domains or organizations, and in some implementations a quorum is selected dynamically such that at least one participant is selected from each of one or more required domains or participant classes.

"Distributed Verdict Engine (DVE)" refers to a process (potentially distributed) for aggregating evaluations of quorum participants into a consensus verdict, including generating cryptographic signatures indicating quorum agreement.

"Tier Trust Engine (TTE)" refers to a module that computes or validates a trust tier classification (e.g., Tier Alpha, Tier Beta, Tier Gamma) based on compliance inputs, credential inputs, telemetry inputs, or combinations thereof, and provides the classification for inclusion in authorization decisions, signed verdict records, or both.

"Eternal Arbitration Ledger (EAL)" refers to a tamper-evident log that records authorization/denial outcomes and associated evidence fields.

"Triune Execution Signature (TES)" refers to a cryptographic signature or signature-derivation value composed from multiple components (e.g., ROHS hash, CRA credential tag, GEN Node sovereign license key) that can be logged and audited.

"Sovereign Signature Log (SSL)" refers to an append-only log that stores TES entries and associated metadata.

"Recursive Consent Suppression Layer (RCSL)" refers to a module that detects and blocks bypass attempts, including recursive trust spoofing and signal re-use, and that can trigger denial and logging behaviors.

"External anchoring" refers to committing a checkpoint value derived from a tamper-evident log to an external timestamping or ledger service to support independent verification of log ordering and integrity.

"Inference API boundary" refers to a software or hardware boundary at which a request would otherwise invoke an inference engine or a downstream execution capability, including an API gateway, runtime wrapper, tool-invocation interceptor, privileged action gate, or container entry point. A downstream execution capability may include a tool call, an external API call, a database write, a transaction initiation, a network operation, or a physical actuator control signal.

"Registry synchronization module" refers to a module that propagates revocation, quarantine, or suspension states across deployments, nodes, or registries so that enforcement remains consistent across linked environments. A registry synchronization module may distribute signed revocation lists, signed suspension updates, or deny lists, and may use one or more dissemination mechanisms including polling, push notifications, gossip protocols, replicated registries, certificate revocation lists (CRLs), OCSP-style status responses, or combinations thereof.

"Usage metering evidence" refers to auditable evidence recorded for authorized executions, including one or more of an execution count, usage units, scope identifiers, timestamps, and cryptographic bindings to ROHS, CRA, ICC, verdict artifacts, or combinations thereof. In some implementations, usage metering evidence is packaged as a signed metering receipt verifiable by an offline verifier and usable for billing settlement, procurement acceptance testing, or dispute resolution, and the metering receipt may support selective disclosure or privacy-preserving proof generation.

"Entitlement token" refers to a machine-verifiable token that represents a permitted execution scope and that may be time-bounded, revocable, metered, or cryptographically bound to an identity, device, verdict record, or combinations thereof. An entitlement token may encode a permitted execution scope as a capability token that enumerates permitted tools, permitted downstream actions, permitted data scopes, rate limits, usage quotas, jurisdiction boundaries, or combinations thereof. In some implementations, authorization for a high-risk execution type further requires validation of a human-oversight token indicating explicit human approval, the human-oversight token being cryptographically bound to at least a request identifier and a permitted scope and being time-bounded, revocable, and recordable in the EAL or SSL.

"Hardware-backed attestation token" refers to attestation evidence generated by a hardware or hardware-isolated environment (e.g., secure enclave, trusted execution environment, or TPM) and verifiable using corresponding verification material.

"Evidence pack" refers to a machine-verifiable bundle of disclosed fields and cryptographic bindings derived from authorization and logging artifacts (e.g., EAL/SSL records and verdict record hashes) that can be validated by an independent verifier. In some implementations, an evidence pack includes a schema version and algorithm identifiers for deterministic canonicalization, hashing, signing, and anchoring, and includes or references a verifier material bundle enabling long-term verification across key rotation and revocation.

"Offline verifier" refers to a verifier computing system that validates an evidence pack or compliance proof without requiring access to the execution compliance system, for example in procurement or audit workflows.

"Policy epoch identifier" refers to a version, epoch, or monotonic counter bound to an active ICC state (e.g., an ICC root hash) and used to detect rollback, downgrade, or constraint-epoch inconsistencies.

"Privacy-preserving compliance proof" refers to a cryptographically verifiable proof that authorization conditions were satisfied while withholding protected content, and may include a selective-disclosure signature or a zero-knowledge proof.

"Selective-disclosure signature" refers to a signature scheme enabling verification of a signed statement while disclosing only a selected subset of signed attributes according to a disclosure policy.

"Zero-knowledge proof" refers to a proof in which a prover demonstrates satisfaction of one or more predicates to a verifier without revealing underlying secret data beyond what is implied by the proof, consistent with a disclosure policy.

"Algorithm_suite_id" refers to an identifier that indicates an algorithm suite used to generate or verify one or more artifacts described herein, including at least one of a verdict record, an evidence pack, a release attestation, or an output provenance receipt. An algorithm_suite_id may specify or reference one or more algorithm identifiers (e.g., canonicalization_id, hash_function_id, signature_scheme_id, key_type_id, or proof_system_id), and may support classical, post-quantum, or hybrid combinations. Inclusion of an algorithm_suite_id is non-limiting and may facilitate deterministic offline verification across algorithm transitions, key rotation, or revocation.

"Output provenance receipt" (OPR), also referred to as an "output receipt," refers to a machine-verifiable receipt that cryptographically binds an AI output, a downstream action result, or a commitment thereto (e.g., output_commitment) to an authorization outcome produced by the triune pre-inference sequence. In some implementations, an output receipt binds to at least one of a verdict record hash, a ROHS-derived commitment, an ICC root hash, a policy epoch identifier, an entitlement token identifier, a trust tier classification, or an anchoring checkpoint reference. An output receipt enables verification of provenance and authorization conditions and does not imply semantic correctness of the output.

"Tool/prompt lock hash" refers to a cryptographic commitment value that binds one or more execution-relevant artifacts to an approved configuration state, including at least one of a tool/skill allowlist, a tool manifest set, a prompt template set, a toolchain identifier, or a lockfile representation. A tool/prompt lock hash may be computed by hashing a canonical representation, hashing a lockfile, or computing a Merkle root over artifact digests, and may be stored in, derived from, or referenced by at least one of an ICC, an entitlement token, a release manifest, an EAL/SSL record, or an evidence pack. Non-limiting examples include a prompt_tool_lock_hash field disclosed for offline verification.

"Policy build receipt" refers to a cryptographically verifiable record that binds a policy source representation and build process to a resulting policy commitment, including at least one of an ICC root hash, a policy bundle hash, or a policy epoch identifier. A policy build receipt may include or commit to one or more of input source hashes, build tool identifiers, build environment measurements, build timestamp, builder identifier, and resulting policy commitments, and may be signed by a build system, a release authority, a secure enclave, or combinations thereof. Policy build receipts are non-limiting and may be referenced by a release attestation or included in an evidence pack for offline verification.

"Release attestation" refers to a cryptographically verifiable statement that a specified set of execution-relevant artifacts corresponds to an approved release state, including at least one of an ICC root hash, a policy epoch identifier, a container image digest, a model or weights digest, a tool/prompt lock hash, or combinations thereof. A release attestation may be generated by a release authority, a build pipeline, a secure enclave, quorum participants, or combinations thereof, and may be recorded in a tamper-evident log or packaged for offline verification. In some implementations, the execution gate may enforce deny-before-inference denial or quarantine when a release attestation required by policy is absent, invalid, revoked, or inconsistent with disclosed commitments.

"Credential transparency log" refers to a tamper-evident, append-only log (or log set) that records issuance, status, revocation, or key-binding events for one or more cryptographic credentials described herein, including at least one of CRA credentials, GEN Node participant credentials, or signing keys used for authorization artifacts. A credential transparency log may provide inclusion proofs, checkpoint hashes, or other verifiable evidence enabling an independent verifier to confirm credential presence and status at a time, and may be operated as an internal, consortium, or public transparency service. Implementations are not limited to a particular transparency mechanism and may include Merkle-tree transparency logs, replicated append-only journals, ledgers, or combinations thereof.

"Anti-equivocation witness": an entity that observes publication of head records or checkpoints for a log/registry and produces a verifiable witness signature or inclusion evidence to detect inconsistent histories.

"Conflict proof": a verifiable proof comprising at least two inconsistent yet individually valid signed records (and corresponding signatures) sufficient for a verifier to conclude equivocation under a defined consistency rule.

"Registry head record": a signed statement representing a latest accepted state of a registry/log, including at least a prev_head commitment.

"Incident receipt": a signed machine-verifiable record describing a governance event (e.g., denial/quarantine/revocation) and bindings to authorization artifacts.

"Incident epoch": a monotonic counter or sequence used to prevent rollback of incident state and to enable deterministic enforcement ordering across deployments.

"Evaluation predicate": a machine-checkable condition whose satisfaction is required prior to authorization, including conditions evidenced by evaluation receipts.

"Evaluation receipt": a signed record committing to evaluation results and scope for a subject artifact (model/release/policy).

"Safety-case pack": an optional bundle that includes evaluation receipts, claims of satisfaction, and verifiable bindings to an attested release state.

"Domain container": any transport packaging that carries signed payloads while preserving canonical verification semantics.

"Canonical bytes": the deterministic byte representation of a payload used for hashing/signing/verification, reconstructed according to canonicalization identifiers.

XI. APPENDICES (ILLUSTRATIVE; NON-LIMITING)

The following appendices provide examiner-friendly traceability materials and implementation examples. The appendices are provided for clarity, licensing readiness, and procurement-oriented verification workflows, and do not limit claim scope. Narrative descriptions are used in place of tables or graphs unless otherwise indicated.

Appendix A—Glossary (Narrative)

The following glossary is a convenience reference. Definitions in Section X control if inconsistencies exist; no definition is limiting unless expressly stated.

AI system: A computer-implemented system that performs inference, prediction, classification, generation, decision assistance, or action selection using one or more models or rule components.

Origin signal: Data used to bind provenance and freshness to an execution request, including biometric-derived features, behavioral dynamics, cryptographic tokens, device attestation tokens, environment measurements, or multimodal combinations.

Interface: A device or service that acquires or generates origin evidence and outputs an origin signal, including sensors, user devices, API gateways, attestation services, or capture pipelines.

ROHS: A cryptographic digest derived from an origin signal and metadata (e.g., identity identifier, timestamp, nonce, entropy features) to bind provenance and freshness.

CRA credential: A cryptographic credential record used to authenticate origin of an origin signal, implemented as a certificate, signed token, public-key record, secure enclave provisioned credential, ledger-anchored record, or combination.

ICC: A tamper-evident representation of permissible execution behaviors, such as a policy Merkle structure, logic-sealed hash tree, append-only constraint log, or other immutable constraint representation.

ELV: A protected storage environment, processing environment, or both that stores at least the ICC (or ICC roots) and prevents unauthorized modification by a host runtime.

GEN Node arbitration: A distributed authorization process in which one or more nodes evaluate an execution request and produce a cryptographically verifiable verdict record, potentially using threshold signatures or multi-signatures.

DVE: A process for aggregating quorum participant evaluations into a consensus verdict (e.g., threshold signing or BFT-style consensus) and outputting a verifiable verdict record.

TTE/trust tier: A module and classification scheme that computes or validates a trust tier (e.g., Alpha/Beta/Gamma) that can control privileges, escalation, or quorum thresholds.

EAL: A tamper-evident log that records authorization or denial outcomes and associated evidence fields, implemented as a hash-chained log, replicated journal, block-chain, or WORM-backed audit log.

TES/SSL: A signature-derived evidence value and an append-only log for storing TES entries and associated licensing or audit metadata.

Entitlement token: A machine-verifiable token that represents permitted execution scope and can be time-bounded, revocable, and metered for licensing.

Usage metering evidence: Evidence recorded to support accounting of authorized executions (e.g., counts, units, scope identifiers, timestamps, and cryptographic bindings).

Registry synchronization module: A module that propagates revocation, quarantine, or suspension states across deployments, nodes, or registries.

RCSL: A module that suppresses bypass attempts, including replay, recursive trust spoofing, automated probing, or origin signal re-use.

Evidence pack: A machine-verifiable bundle derived from EAL/SSL records and verdict artifacts, optionally signed and suitable for independent verification.

Offline verifier: A verifier computing system that validates an evidence pack or compliance proof without accessing the execution compliance system.

Policy epoch identifier: A version, epoch, or monotonic counter bound to an ICC state (e.g., ICC root hash) and used to detect rollback or downgrade.

Anti-rollback guard: A component that detects non-monotonic policy epochs or constraint downgrades and triggers deny-before-inference handling.

Privacy-preserving compliance proof: A proof verifying satisfaction of authorization predicates while withholding protected content, such as a selective-disclosure signature or a zero-knowledge proof.

Disclosure policy: A rule set defining which attributes may be disclosed and which predicates must be proven to a verifier.

Appendix B—Figure Reference Sheet (Narrative)

FIG. 1: a functional block diagram of an example execution compliance system implementing a pre-inference triune enforcement sequence.

FIG. 2: a diagram illustrating an example distributed arbitration and verdict signing workflow.

FIG. 3: a diagram illustrating an example tamper-evident logging architecture with optional external anchoring.

FIG. 4: a diagram illustrating an example fail-closed and quarantine workflow.

FIG. 5: a diagram illustrating an example immutable constraint storage and post-deployment lock mechanism.

FIG. 6: a diagram illustrating an example jurisdictional and compliance evaluation workflow.

FIG. 7: a diagram illustrating an example revocation, quarantine, and suspension propagation workflow.

FIG. 8: a diagram illustrating an example secure channel establishment and key validation workflow.

FIG. 9: a diagram illustrating an example jurisdictional execution firewall for deny-before-inference enforcement.

FIG. 10: a diagram illustrating an example global suspension protocol across linked deployments.

FIG. 11: an integrated architecture diagram illustrating example relationships among origin authentication, constraint validation, distributed arbitration, and logging.

FIG. 12: a diagram illustrating an example entitlement and metering subsystem for licensing and accounting.

FIG. 13: a diagram illustrating an example policy redline enforcement gateway with escalation and lockout.

FIG. 14: a diagram illustrating an example origin-signal processing flow including ROHS generation and anti-replay defenses.

FIG. 15: a diagram illustrating an example multi-jurisdiction arbitration workflow including quorum consensus generation.

FIG. 16: a diagram illustrating an example blacklist, revocation, and registry synchronization mechanism.

FIG. 17: a diagram illustrating example deployment integration patterns at one or more enforcement boundaries.

Appendix C—Claim Element Crosswalk (Narrative; Claims 1-30)

claim 1: End-to-end triune flow: receive execution request; ROHS generation; CRA authentication; ICC/ELV validation; GEN arbitration with quorum-signed verdict record; deny-before-inference gate; EAL logging (e.g., FIGS. 1, 3, 5, 11, 15).

Claim 2: Hardware-backed attestation token binding to CRA verification material (e.g., FIGS. 8, 11, 14).

Claim 3: ICC represented as sealed hash tree or Merkle structure (e.g., FIG. 5).

Claim 4: ELV protection and override denial (e.g., FIGS. 5 and 4).

Claim 5: Merkle proof binding a constraint leaf to an ICC root hash (e.g., FIG. 5).

Claim 6: Quorum evaluation and DVE consensus (e.g., FIGS. 15 and 2).

Claim 7: Trust tier classification validated by TTE (e.g., FIGS. 6 and 11).

Claim 8: Risk-tier or trust-tier dependent quorum threshold control (e.g., FIGS. 6 and 15).

Claim 9: Jurisdictional fingerprint and compliance entropy score gating, including use of either or both (e.g., FIGS. 6 and 9).

Claim 10: Boundary interception points (e.g., FIGS. 1 and 17).

Claim 11: EAL record field set including signature hashes and denial reason code (e.g., FIG. 3).

Claim 12: EAL hash chaining with optional external anchoring (e.g., FIG. 3).

Claim 13: Entitlement token validation as an additional precondition to execution (e.g., FIGS. 1 and 12).

Claim 14: Policy redline enforcement gateway and irreversible lockout prior to inference (e.g., FIG. 13).

Claim 15: Fail-closed handling and quarantine (e.g., FIG. 4).

Claim 16: Method embodiment of claim 1 (e.g., FIG. 1).

Claim 17: Replay/origin re-use suppression via RCSL (e.g., FIG. 14).

Claim 18: Recording replay indicator and denial reason in EAL (e.g., FIG. 3).

Claim 19: Suspension propagation upon severity condition (e.g., FIGS. 7, 10, 16).

Claim 20: Compliance entropy score derived from EAL and drift telemetry and included in arbitration request packet (e.g., FIGS. 6, 9, 15).

Claim 21: Intercept and withhold execution at an enforcement boundary (e.g., FIG. 17).

Claim 22: Method generation and commitment of TES to SSL (e.g., FIGS. 2 and 3).

Claim 23: Method validation of entitlement token and recording metering evidence (e.g., FIG. 12).

Claim 24: Fail-closed handling paths including quarantine and arbitration triggers (e.g., FIG. 4).

Claim 25: Triad-of-keys validation (interface-associated agent credential, root authority record, and GEN Node signature) (e.g., FIG. 8).

Claim 26: Evidence pack generation and independent offline verification (e.g., FIG. 3; Appendix O; Appendix R).

Claim 27: Policy epoch binding and anti-rollback detection (e.g., FIGS. 5 and 13; Appendix P).

Claim 28: Privacy-preserving compliance proof using selective disclosure signature, zero-knowledge proof, or both (e.g., FIG. 3; Appendix Q).

Claim 29: Evidence pack long-horizon verifiability across key rotation and revocation, including at least one of a key identifier, certificate chain reference or certificate_chain_ hash, revocation status evidence (e.g., OCSP/CRL snapshot hash or revocation registry checkpoint hash), or an anchoring checkpoint reference, enabling offline verification after rotation/revocation (e.g., FIG. 3; Appendix O; Appendix R).

Claim 30: Computer-readable medium embodiment of the method (claim 16).

Appendix D—Triune Enforcement Summary (Narrative)

Signal provenance layer: The system binds each execution request to an origin signal and authenticates the origin using ROHS generation and CRA credential verification. Failure conditions include ROHS mismatch, credential revocation, stale timestamps, or replay indicators, which trigger deny-before-inference responses and EAL logging.

Constraint integrity layer: The system validates an execution context against an ICC protected in an ELV. Failure conditions include ICC leaf mismatch, Merkle proof failure, drift scores above thresholds, logic mutation detection, or vault override attempts, which trigger denial, quarantine, and evidence capture. Optional policy epoch binding detects rollback or downgrade attempts.

Distributed authorization layer: The system obtains a quorum-signed verdict record through GEN Node arbitration and DVE consensus. Failure conditions include quorum shortfall, invalid signatures, insufficient quorum threshold, or jurisdiction mismatch, which trigger denial prior to inference and immutable logging.

Audit, licensing, and verification layer: The system records evidence to EAL and optionally to SSL, may anchor checkpoints externally, and may generate signed evidence packs and privacy-preserving compliance proofs for independent verification.

Appendix E—Example Simulation and Test Scenarios (Narrative)

Scenario—Replayed origin evidence: Detect repeated ROHS digest/nonce using RCSL and deny prior to inference; log replay indicator and denial reason; optionally trigger suspension escalation.

Scenario—Credential revoked or expired: Detect revoked CRA credential or invalid entitlement token; quarantine request and deny; record revocation evidence; propagate suspension.

Scenario—ICC mismatch or runtime tampering: Detect ICC leaf mismatch, Merkle proof failure, or vault override attempt; deny before inference; record violated constraint identifier; optionally escalate to revocation cascade.

Scenario—Policy rollback attempt: Detect non-monotonic policy epoch identifier relative to an ELV-protected monotonic counter or anchored checkpoint; deny before inference; record rollback indicator; optionally freeze deployment and propagate suspension.

Scenario—Quorum not reached or verdict invalid: Detect insufficient quorum signatures or invalid verdict record; deny before inference; optionally retry via alternate quorum set; log quorum failure evidence.

Scenario—Jurisdiction mismatch or compliance score below threshold: Deny before inference; record jurisdiction fingerprint hash and compliance score; optionally downgrade trust tier or increase quorum threshold.

Scenario—Offline procurement verification: Generate and sign an evidence pack; validate the pack using an offline verifier; output a procurement-ready pass/fail report with evidence references.

Scenario—Privacy-preserving verification: Generate a selective-disclosure signature or zero-knowledge proof that shows authorization predicates were satisfied while withholding protected content; verify using a third-party verifier.

Appendix F—Claim-to-Flow Map (Narrative)

claims 1 and 16 correspond to the end-to-end flow: receive->ROHS->CRA->ICC/ELV->GEN/DVE->verify verdict->gate execution->log to EAL/SSL.

Claims 2-5 correspond to strengthened provenance and constraint integrity: hardware attestation, sealed ICC structures, ELV isolation, and Merkle proof verification.

Claims 6-8 correspond to distributed authorization hardening: quorum consensus, trust tiers, and risk-adaptive quorum thresholds.

Claims 9-10 and 20-21 correspond to environment-aware and boundary-aware enforcement: jurisdictional attributes, compliance telemetry, and interception points.

Claims 11-13 and 22-24 correspond to auditability and licensing defenses: EAL/SSL field sets, external anchoring, entitlement validation, metering evidence, fail-closed quarantine, and suspension propagation; claim 14 corresponds to policy redline enforcement and irreversible lockout prior to inference; and claim 15 corresponds to fail-closed handling and quarantine.

Claims 26-28 correspond to procurement and regulatory verification artifacts: evidence packs and offline verification; policy epoch binding and anti-rollback; and privacy-preserving compliance proofs.

Claim 29 corresponds to evidence-pack survivability across key rotation or credential revocation, including key identifiers, certificate-chain references/hashes, revocation status evidence, or anchoring checkpoints enabling offline verification over time.

Appendix G—Enforcement Clusters (Narrative)

Origin and provenance cluster: ROHS generation, CRA credential matching, optional hardware attestation, freshness and replay defenses, and origin-bound authorization.

Constraint integrity cluster: ICC representation and validation, ELV isolation, drift/mutation detection, policy epoch binding, and anti-rollback guarding.

Distributed authorization cluster: GEN Node evaluation, DVE consensus, trust tiering, and quorum threshold control.

Audit and verification cluster: EAL/SSL logging, external anchoring, evidence pack generation for offline verification, and privacy-preserving compliance proof generation.

Licensing and accounting cluster: entitlement validation, usage metering evidence, and verifiable receipts usable in procurement and audit workflows.

Appendix H—Trust Tiers and Escalation Logic (Narrative; Illustrative)

Tier Alpha (illustrative): Highest privilege within ICC constraints; may allow broader execution types and lower friction for low-risk operations; still requires verified verdict and logging.

Tier Beta (illustrative): Restricted privileges; sensitive execution types require higher quorum thresholds or additional reviewers; repeated violations may trigger quarantine or suspension.

Tier Gamma (illustrative): Minimal or read-only privileges; high-risk actions are denied by default or require exceptional quorum thresholds; anomalies trigger automatic denial and logging.

Quarantine/Suspension (optional): Execution is denied prior to inference; requests may be stored for review; suspension can propagate via registry synchronization modules.

Appendix I—Signal to Judgment to Execution Flow (Narrative)

Stage 1—Signal received: Interface receives or generates origin signal and packages timestamp, nonce, and optional hardware-backed attestation token.

Stage 2—ROHS generation: System extracts features and computes ROHS digest to bind provenance and freshness.

Stage 3—Origin authentication: System matches ROHS digest to CRA credential and outputs CRA match result, optionally confirming against a licensed entropy baseline.

Stage 4—Constraint validation: System validates execution context against ICC protected by ELV; outputs ICC validation result and optional Merkle proof; binds to policy epoch identifier if used.

Stage 5—Arbitration request: System builds an arbitration request packet including CRA match result, ICC validation result, policy epoch identifier (optional), and optional jurisdiction/compliance attributes; transmits to quorum nodes.

Stage 6—Quorum consensus: GEN Nodes evaluate request and DVE produces quorum-signed verdict record; optional trust tier and quorum threshold included.

Stage 7—Verdict verification: System verifies signatures/threshold and binds verdict to arbitration request packet.

Stage 8—Pre-inference gate: System permits execution only upon verified triune success; otherwise denies before inference or downstream action.

Stage 9—Logging and licensing: System records evidence to EAL/SSL, optionally anchors checkpoints externally, and optionally records entitlement validation and usage metering evidence.

Stage 10—Evidence pack and privacy proof (optional): System generates and signs an evidence pack; optionally generates a selective-disclosure signature or zero-knowledge proof for third-party verification.

Appendix J—Optional Perimeter Modules and Extensions (Narrative)

Replay and revocation guard: Rejects re-use of ROHS digests, stale timestamps, or revoked credentials; flags repeated attempts; triggers quarantine or suspension.

Purpose and scope guard: Denies execution when requested behavior deviates from permitted execution scope represented by ICC and entitlement tokens.

Policy epoch guard: Detects rollback or downgrade attempts by enforcing monotonic policy epoch identifiers and denial upon non-monotonic epochs.

Bypass-pattern detector: Detects recursive probing and automated bypass loops; applies cooldown/rate limits; records evidence.

Privacy proof module: Generates selective-disclosure signatures, zero-knowledge proofs, or both enabling third-party verification without revealing protected content.

Cross-deployment revocation sync: Propagates revocation, quarantine, or suspension states across deployments and registries.

External anchoring service: Anchors EAL checkpoints to external timestamping or public ledgers for dispute-resistant integrity verification.

Appendix K—Entitlement and Metering (Narrative; Licensing-Friendly)

Entitlement tokens may encode permitted execution scope (e.g., permitted model identifier, permitted tool classes, rate limits, time windows, jurisdiction boundaries, approved action types, permitted policy epoch ranges, or combinations thereof). Tokens may be signed by an issuing authority and may be revocable or renewable. In some implementations, entitlement tokens include capability tokens for tool/action allowlists and may require additional human-oversight tokens for high-risk actions; revocation can be distributed via revocation registries, deny lists, or CRLs.

Metering evidence may be recorded per authorized execution, per session, or per billing interval, and may include cryptographic bindings to ROHS hashes, CRA identifiers, ICC root hashes, policy epoch identifiers, verdict record hashes, timestamps, and usage unit counts. Metering evidence can be used to support subscription licensing, usage-based pricing, procurement acceptance tests, or compliance audits. In some implementations, metering evidence is packaged as a signed metering receipt that is independently verifiable offline and usable for billing settlement and dispute resolution, and the signed metering receipt may support selective disclosure or zero-knowledge compliance proofs.

In some implementations, selected entitlement and metering fields are included in the evidence pack 251, enabling an offline verifier 260 to validate both technical authorization and licensing/accounting compliance without access to the execution compliance system. In some implementations, the evidence pack 251 includes or references at least one of signed metering receipts, suspension update identifiers, revocation registry checkpoints, or human-oversight tokens, enabling an offline verifier 260 to validate both authorization and governance controls.

Appendix L—Design-Around Resistance Notes (Narrative; Non-Limiting)

Origin attestation is not limited to biometrics. Implementations may use any origin evidence that can be hashed, signed, attested, or otherwise bound to a CRA credential, including device attestation, behavioral dynamics, cryptographic tokens, or multimodal combinations.

ICC structures are not limited to a specific data structure. Implementations may use Merkle trees, hash DAGs, signed policy bundles, append-only constraint logs, or other tamper-evident representations, provided that runtime behavior can be validated against an immutable constraint representation protected from runtime modification.

Policy epoch binding is not limited to a specific counter mechanism. Implementations may use monotonic counters, secure clock epochs, ledger-anchored versioning, or enclave-backed sealed state, provided that rollback or downgrade attempts are detectable and enforceable via deny-before-inference handling.

Distributed authorization is not limited to a particular consensus protocol. Quorum signing may be implemented using multi-signatures, threshold signatures, BFT consensus, or replicated approval services, and may be deployed as internal microservices, on-prem clusters, or cross-organization councils. In some implementations, an authorization verdict may be produced by one or more participants (including a single authorization node for low-risk execution types), provided that the resulting verdict record is cryptographically verifiable and bound to the evaluated request. In some implementations, quorum participant selection is dynamic and policy-driven, including separation-of-duties constraints requiring signatures from multiple administrative domains (e.g., provider plus customer plus auditor/ regulator) for high-risk execution types or privileged actions.

Deny-before-inference gating can be integrated at multiple boundaries, including inference APIs, model runtime wrappers, tool-invocation interceptors, container entry points, and privileged action gates.

Offline verification and procurement artifacts are optional and may be implemented using signed evidence packs, anchored logs, and verifier material bundles. Privacy-preserving compliance proofs may be implemented using selective-disclosure signatures, zero-knowledge proofs, or other cryptographic techniques enabling verification while withholding protected content.

External anchoring is optional and can be implemented via checkpoint hashes committed to any timestamping or ledger service capable of proving ordering and integrity.

Appendix N—Reference Numerals (Illustrative; Non-Limiting)

The following reference numerals are provided as an examiner-friendly convenience to illustrate example components that may be used to implement the claimed triune pre-inference execution gate and verification artifacts. The reference numerals correspond to non-limiting examples depicted in FIGS. 1-17; no element identified by a reference numeral is required for every implementation, and reference numerals do not limit claim scope.

Example reference numerals (non-limiting): execution compliance system 100; interface 110; cognitive interface 112; origin signal 113; origin signal packet 115; hardware-backed attestation token 116; secure channel 118; ROHS generation module 120; ROHS digest 121; CRA credential store 130; CRA credential 131; origin authentication module 140; CRA match result 141; execution request 152; execution context 154; ICC validator 150; ICC validation result 151; ICC 155; ICC root hash 156; constraint leaf 157; Merkle proof 158; ELV 160; GEN Node arbitration interface 170; GEN Nodes/quorum participants 171; DVE 172; verdict record 173; TTE 174; trust tier classification 175; jurisdiction/compliance engine 176; jurisdictional fingerprint 177; compliance entropy score 178; execution gate 180; inference API boundary 181; inference engine 182; action/tool executor 184; EAL 190; SSL 192; TES 193; external anchoring 194; entitlement engine 200; entitlement token 201; metering engine 210; usage metering evidence 211; RCSL 220; quarantine store 230; registry synchronization module 240; evidence pack generator 250; evidence pack 251; evidence-pack signing key 252; evidence pack store 253; offline verifier 260; verifier material bundle 261; policy epoch identifier 270; epoch store 271; anti-rollback guard 272; privacy proof generator 280; selective-disclosure signature 281; zero-knowledge proof 282; proof verification module 283; disclosure policy 284.

Appendix O—Evidence Pack Field Set (Illustrative; Licensing-Friendly)

In some implementations, the system generates or maintains a machine-verifiable evidence pack 251 derived from EAL/SSL records for audit, procurement acceptance testing, dispute resolution, or licensing verification. The evidence pack 251 is optional and may be implemented as a structured record, a signed bundle, or a verifiable receipt set. The following field examples are illustrative and non-limiting.

Example evidence pack fields (non-limiting): request_id (unique request identifier); timestamp (authorization/denial timestamp); interface_id (identifier of interface 110); roh-s_hash (hash of ROHS digest 121 or ROHS-derived commitment); cra_credential id (identifier or hash of CRA credential 131); cra_match result (boolean/score and optional revocation status); icc_root_hash (ICC root hash 156); policy_epoch_id (policy epoch identifier 270, if used); execution_context_hash (hash/commitment of execution context 154); constraint_leaf_id (identifier of constraint leaf 157, if disclosed); merkle_proof (Merkle proof 158, if disclosed); verdict_record_hash (hash/commitment of verdict record 173); quorum_signature_set or threshold_signature (signature material for verdict record 173); trust_tier (trust tier classification 175, if used); quorum_threshold (required threshold, if used); jurisdiction_fingerprint_hash (hash of jurisdictional fingerprint 177, if used); compliance_entropy_score (score 178, if used); entitlement_token_id (identifier or hash of entitlement token 201, if used); usage_metering_record (usage units, metering evidence 211, or both, if used); tes_hash or tes (TES 193 or hash thereof, if used); denial_reason_code (if denied); anchoring_checkpoint (checkpoint hash, external anchor reference 194, or both, if used); evidence_pack_signature (signature over the evidence pack using signing key 252); verifier_material_references (references or hashes for verifier bundle 261); privacy_proof_reference (reference to selective-disclosure signature 281 or zero-knowledge proof 282, if used); control_point_id (identifier of an enforcement control point, if used); control_point_registry_hash (commitment to a control-point registry snapshot, if used); permit_semantics_id (permit semantics identifier, if used); receipt_id (identifier of a receipt, if used); parent_receipt_id (identifier of a parent receipt, if used); child_receipt_hashes (hashes/commitments to child receipts, if used); chain_root_hash (commitment to a receipt graph or chain root, if used); credential_status_snapshot_hash (commitment to a credential status snapshot, if used); as_of_time (timestamp for status validation, if used); revocation_registry_checkpoint_hash (commitment to a revocation registry checkpoint, if used).

In some implementations, the evidence pack 251 is encoded as a canonical serialization (e.g., CBOR or JSON), signed, and optionally accompanied by a verifier bundle 261 containing public keys, certificate chains, and anchor references required for offline verification. In some implementations, the canonical serialization includes a schema_version and algorithm identifiers (e.g., canonicalization_id, hash_function_id, signature_scheme_id) and applies deterministic field ordering and normalization to enable deterministic verification by independent verifier systems.

Appendix P—Policy Epoch Binding and Anti-Rollback (Narrative; Non-Limiting)

In some implementations, an ICC state is associated with a policy epoch identifier 270. The policy epoch identifier 270 may be incremented upon a policy change, ICC root update, or constraint-set update, and stored in epoch store 271 protected by the ELV 160.

When processing an execution request, the system may bind the policy epoch identifier 270 to at least one of: an arbitration request packet, a verdict record 173, an EAL record, or an evidence pack 251. The system may detect rollback when a received epoch is lower than a previously accepted epoch, inconsistent with a monotonic counter, or inconsistent with an anchored checkpoint.

Upon rollback detection, the anti-rollback guard 272 may deny execution prior to inference, record a rollback indicator and denial reason in the EAL 190, quarantine artifacts, and propagate a suspension state across linked deployments via registry synchronization module 240.

Appendix Q—Privacy-Preserving Compliance Proof (Narrative; Non-Limiting)

In some implementations, privacy proof generator 280 generates a privacy-preserving compliance proof to demonstrate satisfaction of authorization predicates while withholding protected content. Authorization predicates may include, for example, verified quorum signatures, valid CRA match result, ICC root binding, and policy epoch non-rollback.

Selective-disclosure example (non-limiting): the evidence pack 251 is signed using a selective-disclosure signature 281 that enables a verifier to validate the signature while revealing only a subset of attributes (e.g., rohs_hash, icc_root_hash, verdict_record_hash, policy_epoch_id, and anchoring_checkpoint) according to disclosure policy 284.

Zero-knowledge example (non-limiting): the proof generator outputs a zero-knowledge proof 282 demonstrating that disclosed commitments correspond to a valid authorization outcome (e.g., membership of a constraint leaf in an ICC root via Merkle proof commitments, validity of quorum signatures, and monotonic policy epoch) without revealing the full origin signal, execution context, or full ICC contents. Proof verification module 283 verifies the proof under disclosure policy 284.

Appendix R—Offline Verifier Procedure (Narrative; Non-Limiting)

In some implementations, offline verifier 260 accepts an evidence pack 251 and verifier bundle 261 and produces an independent verification report. The report may be used in procurement acceptance testing, regulator submissions, or licensing audits.

Non-limiting verification steps include: (i) verify the evidence pack signature using verifier materials; (ii) verify verdict record signatures or threshold signature; (iii) verify hash bindings among rohs_hash, execution_context_hash, icc_root_hash, policy_epoch_id, and verdict_record_hash; (iv) verify anchoring checkpoint consistency if external anchoring is used; and (v) verify entitlement and metering fields if present. The verifier may output a pass/fail result and a machine-readable verification log.

Appendix S—Agent Lockdown Profile (Illustrative; Non-Limiting)

In some implementations, the execution compliance system enforces a machine-readable "agent lockdown profile" for tool-use or action-capable AI systems. The lockdown profile is a non-limiting example of an ICC-represented constraint set, an entitlement-encoded scope, or both, and may be validated by the execution gate prior to any inference computation, tool invocation, or downstream action.

S1. Minimal lockdown predicates (non-limiting). A lockdown profile may require one or more of: (i) fail-closed denial or quarantine when any required verification artifact is absent or unverifiable; (ii) tool/action allowlists expressed as capability tokens, signed manifests, or ICC constraint leaves; (iii) destination-scoped network permissions (e.g., default deny with permit rules) represented as ICC constraints and enforced at a tool-invocation boundary or privileged action gate; (iv) isolation of secrets such that runtime components cannot directly read long-lived credentials, and only scoped, time-bounded tokens are usable; (v) high-risk actions requiring a human-oversight token, multi-party quorum threshold, or both; (vi) deterministic reason codes for denial/quarantine outcomes; and (vii) drift/rollback control via policy epoch binding and deny-before-inference handling upon non-monotonic epochs.

S2. Lockdown evidence pack (non-limiting). In some implementations, the evidence pack includes disclosed commitments sufficient for offline verification of lockdown predicates, including one or more of: an allowlist commitment (e.g., allowlist hash and signature reference), a policy epoch identifier, an ICC root hash, a destination permission commitment (e.g., permit-rule hash), a verdict binding value, and a denial reason code when denied. The evidence pack may further include schema_version and algorithm identifiers enabling deterministic offline verification.

S3. Acceptance tests for procurement (non-limiting). In some implementations, an offline verifier validates that: (i) invocation of a non-allowlisted tool/action is denied prior to execution; (ii) attempted exfiltration or outbound communication to a non-permitted destination is denied prior to execution; (iii) untrusted content cannot trigger privileged actions without additional authorization; (iv) privileged actions without a valid human-oversight token are denied or quarantined; (v) policy drift or rollback is detected via policy epoch binding and triggers deny-before-inference; and (vi) offline replay verification yields the same pass/fail predicates and reason code classifications for a given evidence pack.

S4. Non-limiting scope statement. The lockdown profile may be applied to any tool-use or action-capable AI system, including personal agents, enterprise agents, workflow automation agents, or multi-agent orchestrators, and is not limited to any vendor, framework, or skill marketplace.

Appendix T—Cryptographic Algorithm Agility and Post-Quantum/Hybrid Readiness (Narrative; Non-Limiting)

In some implementations, one or more authorization artifacts, including a verdict record, an evidence pack, a release attestation, or an output provenance receipt, are generated using an algorithm suite that is cryptographically self-describing to enable long-horizon verification and cryptographic agility. The algorithm suite may include classical algorithms, post-quantum algorithms, or hybrid combinations, and selection of the suite is non-limiting.

In some implementations, the evidence pack includes an algorithm_suite_id and one or more algorithm identifiers, such as canonicalization_id, hash_function_id, signature_scheme_id, and key_type_id, sufficient for an offline verifier to deterministically reconstruct commitments and validate signatures. The algorithm_suite_id may be bound to at least one of a verdict record hash, an anchoring checkpoint, or both.

Hybrid signatures example (non-limiting): an artifact may be signed under two or more distinct signature schemes (e.g., one classical and one post-quantum) over the same canonical payload, and the evidence pack may include both signatures or an aggregate representation. Verification policy may require successful verification of a specified subset (e.g., both, or at least one) and may be recorded as a verifier predicate result.

Key and algorithm migration example (non-limiting): to support verification after key rotation, revocation, or algorithm transition, the verifier material bundle may include cross-certification evidence, prior key identifiers, or revocation status evidence (e.g., snapshot hashes) associated with the algorithm_suite_id, and the system may bind migration checkpoints to EAL anchoring to support dispute-resistant long-term verification.

Appendix U—Output Provenance Receipt (Narrative; Non-Limiting)

In some implementations, the execution compliance system generates an output provenance receipt (OPR) that cryptographically binds an AI output (or a downstream action result) to a verified authorization outcome. The OPR enables a third party to verify that the output was produced only after the triune pre-inference sequence succeeded and is not a statement about semantic correctness of the output.

In some implementations, the system computes an output_commitment value (e.g., output_hash) by applying a canonicalization procedure to at least a portion of the output and hashing the canonical form. The canonicalization procedure and hash function may be indicated by algorithm identifiers or an algorithm_suite_id to enable deterministic verification.

In some implementations, the OPR includes or references one or more bindings such as: request_id; timestamp; output_commitment; verdict_record_hash; rohs_hash (or rohs-derived commitment); icc_root_hash; policy_epoch_id (if used);

entitlement_token_id (if used); trust_tier (if used); and an optional anchoring_checkpoint reference. The OPR may be signed by an evidence-pack signing key, a TES-derived key, a quorum participant key, or combinations thereof.

In some implementations, the OPR is delivered with the output, stored in the EAL or SSL, packaged within an evidence pack, or transmitted via a separate channel (e.g., headers or a receipt API). In some implementations, the OPR includes an output_type identifier or output_metadata_hash (e.g., tool result digest, action type, or content class) without revealing protected content.

In some implementations, the offline verifier validates the OPR by verifying signatures and hash bindings to the verdict record and optionally to anchored checkpoints, and produces a machine-readable PASS/FAIL result for an "output provenance" predicate. In further optional implementations, the OPR supports selective disclosure signatures or privacy-preserving proofs that validate the binding predicates while withholding protected output content.

Appendix V-Policy & Artifact Supply Chain Attestation (Narrative; Non-Limiting)

In some implementations, prior to authorizing execution, the execution compliance system validates an attested release state for one or more execution-relevant artifacts, such as a policy bundle, model/runtime measurements, tool/action manifests, or other configuration artifacts, to reduce supply-chain substitution, unauthorized updates, or drift. Supply-chain attestation is an optional non-limiting enhancement that may be enforced via deny-before-inference gating.

In some implementations, the system maintains a signed release manifest that commits (e.g., via hashes) to one or more artifacts, including: an ICC root hash; a policy epoch identifier; a container image digest; a model identifier or weights digest; a tool/skill allowlist hash; a toolchain version identifier; a prompt/tool lockfile hash; and one or more build environment measurements. The release manifest may be stored within the ELV, recorded in the EAL, or both.

In some implementations, a policy build receipt binds a policy source representation and build toolchain to an ICC root hash, including one or more of: build_id; builder identity or credential identifier; build timestamp; input source hashes; compiler or policy-as-code tool identifiers; and the resulting ICC root hash. The policy build receipt may be cryptographically signed and referenced by, or included in, the release manifest.

In some implementations, the execution gate denies or quarantines execution prior to inference when a required release attestation is absent, invalid, revoked, mismatched, or inconsistent with an ICC root hash, policy epoch identifier, entitlement scope, or combinations thereof. The denial or quarantine result may be recorded with a denial reason code and may trigger suspension propagation via registry synchronization.

In some implementations, the evidence pack includes one or more supply-chain commitments, such as release_manifest_hash, policy_build_receipt_hash, tool_allowlist_hash, prompt_tool_lock_hash, container_image_digest, model_weights_digest, and an algorithm_suite_id, enabling offline verification that the execution occurred under an attested release state. In further optional implementations, an offline verifier validates that the attested release commitments match disclosed execution context commitments and outputs a PASS/FAIL predicate for an "attested release state" condition.

Non-limiting acceptance scenarios include: (i) a tool invocation attempt under a non-allowlisted tool manifest is denied prior to execution; (ii) an execution request under a mismatched container image digest is denied or quarantined; (iii) a policy rollback or constraint downgrade attempt is denied via policy epoch binding; and (iv) an evidence pack that omits required release attestations fails offline verification.

No single feature or group of features is necessary or indispensable for every implementation. Features described in connection with one implementation may be combined with features described in connection with other implementations. The scope of the invention is defined by the claims and their equivalents.

Appendix W—Non-Equivocation Witness & Conflict Proof (Illustrative; Non-Limiting)

w0. Purpose (Non-Limiting)

This appendix provides examiner-friendly, procurement-oriented structures for (i) registry head records, (ii) anti-equivocation witness evidence, and (iii) conflict proofs evidencing equivocation (e.g., forked histories), enabling independent offline verification of log/registry integrity. Any normative terms (e.g., MUST/SHOULD) appearing below describe one non-limiting example verifier contract and are not requirements of the invention and do not limit claim scope.

w1. Canonicalization & Deterministic Bytes (Verifier-Contract Example; Non-Limiting)

canonicalization_id MUST identify a deterministic canonicalization procedure used to form canonical bytes of signed payloads.

payload_digest MUST be computed over canonical bytes.

A verifier MUST recompute payload_digest from canonical bytes and MUST verify signatures over either:

the canonical bytes, or the payload_digest (signature-over-digest), as indicated by signature_scheme_id.

W2. Field Set—Registry_Head_Record (Non-Limiting)

A registry head record MAY be encoded as a JSON object (canonicalized under canonicalization_id) including:

schema_version (string)—e.g., "W1.0"

head_id (string)—e.g., sha256 (canonical_bytes (head_payload))

prev_head_hash (string)—hash commitment to previous accepted head record checkpoint_type (string)—e.g., "EAL_CHECKPOINT", "RELEASE_MANIFEST", "EVIDENCE PACK", "SSL_CHECKPOINT"

checkpoint_hash (string)—commitment to checkpoint payload policy_epoch_id (string, optional)—monotonic epoch for anti-rollback binding publisher_id (string)—publishing authority identifier issued_time (string, ISO 8601)

algorithm_suite_id (string)—self-describing algorithm suite (non-limiting)

canonicalization_id (string)

hash_function_id (string)

signature_scheme_id (string)

head_payload_digest (string)—digest of canonical bytes of head_payload publisher_signature (object)—signature by publisher witness_threshold (object, optional)—required witness classes/domains and threshold rules witness_evidence (array, optional)—witness signatures/inclusion evidence extensions (object, optional)—non-limiting extension fields W3. Field Set—Witness_Evidence Entries (Non-Limiting)

Each witness evidence entry MAY include:

witness_id (string)

witness_domain_class (string)—e.g., "PROVIDER", "CUSTOMER", "AUDITOR", "REGULATOR", "INDEPENDENT"

observed_head_payload_digest (string)

observed_time (string, ISO 8601)

witness_nonce (string, optional)

witness_key_id (string)

witness_signature (string)—over canonical bytes or digest, per signature_scheme_id inclusion proof (object, optional)—if witness evidence is logged in a transparency log W4. Field Set—Conflict Proof (Non-Limiting)

A conflict proof MAY include:

schema_version (string)—e.g., "W1.0"

proof_id (string)

rule_id (string)—e.g., "PREV_HEAD FORK"/"CHECKPOINT_DIVERGENCE"

detected_time (string, ISO 8601)

reporter_id (string)

inconsistent_heads (array)—at least two full registry_head_record objects (or commitments+retrieval pointers)

consistency_rule (object)—rule definition used to classify inconsistency (non-limiting)

witness_bundle (array, optional)—witness evidence supporting detection proof_digest (string)—digest over canonical bytes of proof payload reporter_signature (object)—optional signature by reporter/arbiter w5. Consistency Rules (Non-Limiting)

A non-limiting rule set:

R1 (No Fork on Same prev_head_hash): For any accepted prev_head_hash, there MUST NOT exist two valid head records with the same prev_head_hash and different checkpoint_hash.

R2 (Chain continuity): A head record MUST reference a prev_head_hash that is either a designated genesis value or a verifiable prior head record.

R3 (Monotonic policy epoch): If policy_epoch_id is present, it MUST be non-decreasing across accepted heads and MUST be consistent with anti-rollback policy.

w6. Offline Verifier Predicates (Non-Limiting)

A verifier MAY output PASS/FAIL/HOLD for each predicate:

P_HEAD_SIG_VALID—publisher signature valid over head payload

P_WITNESS_THRESHOLD SAT—witness threshold satisfied (if required)

P_CHAIN_CONTINUITY—prev_head linkage verifiable

P_NO_EQUIVOCATION—no valid conflict proof detected under R1/R2

P_CONFLICT_PROOF_VALID—if present, conflict proof is valid and evidences equivocation Non-limiting outcomes:

PASS: head chain valid, witness rules satisfied, no valid conflict proof.

FAIL: valid conflict proof evidences equivocation (e.g., fork).

HOLD: insufficient witness evidence/missing prior head/missing required artifacts.

W7. Example JSON—Registry_Head_Record.Json

```
{
  "schema_version": "W1.0",
  "head_payload": {
    "prev_head_hash": "sha256:0a3f...b912",
    "checkpoint_type": "EAL_CHECKPOINT",
    "checkpoint_hash": "sha256:9c88...7e10".
    "policy_epoch_id": "epoch:0000000000000421",
    "publisher_id": "CRA:publisher:mvg-ra-01",
    "issued_time": "2026-02-18T08:55:12Z"
  },
  "algorithm_suite_id": "suite:sha256+ed25519",
  "canonicalization_id": "canon:json-deterministic-v1",
  "hash_function_id": "hash:sha256",
  "signature_scheme_id": "sig:ed25519",
  "head_payload_digest": "sha256:7b2d...a4c9",
  "head_id": "sha256:7b2d...a4c9",
  "publisher_signature": {
    "key_id": "key:CRA:publisher:mvg-ra-01#2026q1",
    "sig": "base64:MEUCIQD...snip..."
  },
  "witness_threshold": {
    "rule_id": "WITNESS_MULTI_DOMAIN_V1",
    "required_domains": ["PROVIDER", "CUSTOMER"],
    "min_total_witnesses": 2,
    "min_per_domain": { "PROVIDER": 1, "CUSTOMER": 1 }
  },
```

```
    "witness_evidence": [
        {
            "witness_id": "WIT:provider:gen-171",
            "witness_domain_class": "PROVIDER",
            "observed_head_payload_digest": "sha256:7b2d...a4c9",
            "observed_time": "2026-02-18T08:55:13Z",
            "witness_key_id": "key:GEN:171#k1",
            "witness_signature": "base64:MC4CFQ...snip..."
        },
        {
            "witness_id": "WIT:customer:tenant-a-01",
            "witness_domain_class": "CUSTOMER",
            "observed_head_payload_digest": "sha256:7b2d...a4c9".
            "observed_time": "2026-02-18T08:55:14Z",
            "witness_key_id": "key:CUST:tenant-a-01#k9",
            "witness_signature": "base64:MC0CFQ...snip..."
        }
    ]
}
```

W8. Example JSON - conflict_proof.json

```
{
    "schema_version": "W1.0",
    "proof_id": "proof:conflict:2026-02-18T09:02:00Z:001",
    "rule_id": "PREV_HEAD_FORK",
    "detected_time": "2026-02-18T09:02:00Z",
    "reporter_id": "OFFLINE_VERIFIER:mvg-verify-01",
    "consistency_rule": {
        "rule_id": "R1_NO_FORK_SAME_PREV_HEAD",
        "description": "Two valid head records share the same prev_head_hash but differ in
checkpoint_hash."
    },
    "inconsistent_heads": [
        {
        "schema_version": "W1.0",
        "head_payload": {
            "prev_head_hash": "sha256:0a3f...b912",
            "checkpoint_type": "EAL_CHECKPOINT",
            "checkpoint_hash": "sha256:9c88...7e10",
            "policy_epoch_id": "epoch:0000000000000421",
            "publisher_id": "CRA:publisher:mvg-ra-01",
            "issued_time": "2026-02-18T08:55:12Z"
        },
        "algorithm_suite_id": "suite:sha256+ed25519",
        "canonicalization_id": "canon:json-deterministic-v1",
        "hash_function_id": "hash:sha256",
        "signature_scheme_id": "sig:ed25519",
        "head_payload_digest": "sha256:7b2d...a4c9",
        "head_id": "sha256:7b2d...a4c9",
        "publisher_signature": { "key_id": "key:CRA:publisher:mvg-ra-01#2026q1", "sig":
"base64:..." }
    },
    {
        "schema_version": "W1.0",
        "head_payload": {
            "prev_head_hash": "sha256:0a3f...b912",
            "checkpoint_type": "EAL_CHECKPOINT",
            "checkpoint_hash": "sha256:1111...2222",
            "policy_epoch_id": "epoch:0000000000000421",
            "publisher_id": "CRA:publisher:mvg-ra-01",
            "issued_time": "2026-02-18T08:56:01Z"
        },
        "algorithm_suite_id": "suite:sha256+ed25519",
        "canonicalization_id": "canon:json-deterministic-v1",
        "hash_function_id": "hash:sha256",
        "signature_scheme_id": "sig:ed25519",
        "head_payload_digest": "sha256:9aa9...bob0",
        "head_id": "sha256:9aa9...bob0",
        "publisher_signature": { "key_id": "key:CRA:publisher:mvg-ra-01#2026q1", "sig":
"base64:..." }
        }
    ],
    "proof_digest": "sha256:3f3f...caca",
    "reporter_signature": {
        "key_id": "key:OFFLINE_VERIFIER:mvg-verify-01#k2",
        "sig": "base64:MEYCIQ...snip..."
    }
}
```

Appendix X—Incident Receipt, Reason Codes, and Enforcement Acknowledgments (Illustrative; Non-Limiting)

X0. Purpose (Non-Limiting)

This appendix provides structures for signed incident receipts and enforcement acknowledgments usable for governance, audits, procurement, and dispute-resistant response evidence. Any normative terms (e.g., MUST/SHOULD) appearing below describe one non-limiting example verifier contract and are not requirements of the invention and do not limit claim scope.

X1. Minimal Reason Code Registry (Non-Limiting)

A minimal registry MAY include:
ROHS_REPLAY_DETECTED
CRA_CREDENTIAL REVOKED OR EXPIRED
ICC_MERKLE_PROOF FAIL
POLICY_ROLLBACK_DETECTED
VERDICT_SIGNATURE INVALID
QUORUM_SHORTFALL
JURISDICTION MISMATCH
NON_ALLOWLISTED TOOL OR ACTION
ENTITLEMENT TOKEN INVALID
EQUIVOCATION_CONFLICT PROOF_VALID
ANCHOR_MISMATCH
CANONICAL RECONSTRUCTION MISMATCH
(optional) EVAL_RECEIPT MISSING OR STALE
Severity (non-limiting):
S0_INFO, S1_LOW, S2_MEDIUM, S3_HIGH, S4_CRITICAL X2. Field Set—incident_receipt.json (non-limiting)
schema_version (string)—e.g., "X1.0"
incident_id (string)—unique
incident_epoch (string)—monotonic sequence to prevent rollback
event_type (string)—e.g., "DENIAL", "QUARANTINE", "REVOCATION", "SUSPENSION", "ROLLBACK_DETECTED", "EQUIVOCATION"
severity (string)
reason_code (string)
subject (object)—subject identifiers (non-limiting)
scope (object)—enforcement scope (deployment, tenant, model, tool class, jurisdiction)
bindings (object)—cryptographic bindings (non-limiting)

effective_time (string, ISO 8601)
expiration_time (string, ISO 8601, optional)
issuer_id (string)
algorithm_suite_id (string)
canonicalization_id (string)
signature_scheme_id (string)
payload_digest (string)
issuer_signature (object)
Bindings (non-limiting) MAY include:
rohs_hash
icc_root_hash
policy_epoch_id
verdict_record hash
registry_head_hash
evidence_pack_hash
anchoring_checkpoint X3. Field Set—Enforcement_Ack.Json (Non-Limiting)
schema_version (string)—"X1.0"
ack_id (string)
incident_id (string)
enforcing_deployment_id (string)
enforcement_epoch (string)—monotonic at enforcing deployment
enforced_scope (object)
outcome (string)—"ENFORCED", "NOT_APPLICABLE", "FAILED"
reason_code (string, optional)
enforcement_time (string, ISO 8601)
algorithm_suite_id (string)
payload_digest (string)
enforcer_signature (object)

X4. Propagation Rules (Verifier-Contract Example; Non-Limiting)

A recipient deployment MUST verify issuer_signature and MUST verify incident_epoch monotonicity (or fail closed).

A recipient deployment MUST deny-before-inference for the incident's scope when severity is S3_HIGH or S4_CRITICAL, unless policy explicitly permits a break-glass path with additional authorization.

A deployment SHOULD emit an enforcement acknowledgment and SHOULD record an acknowledgment hash in an append-only log.

X5. Example JSON—reason codes min registry.json

```
{
  "schema version": "X1.0",
  "registry_id": "reason-codes:min:v1",
  "codes": [
    {"code": "ROHS_REPLAY_DETECTED", "severity_default": "S3_HIGH"},
    {"code": "CRA_CREDENTIAL_REVOKED_OR_EXPIRED", "severity_default":
"S4_CRITICAL"},
    {"code": "ICC_MERKLE_PROOF_FAIL", "severity_default": "S4_CRITICAL"},
    {"code": "POLICY_ROLLBACK_DETECTED", "severity_default":
"S4_CRITICAL"},
    {"code": "VERDICT_SIGNATURE_INVALID", "severity_default":
"S4_CRITICAL"},
    {"code": "QUORUM_SHORTFALL", "severity_default": "S3_HIGH"},
    {"code": "JURISDICTION_MISMATCH", "severity_default": "S3_HIGH"},
    {"code": "NON_ALLOWLISTED_TOOL_OR_ACTION", "severity_default":
"S3_HIGH"},
    {"code": "ENTITLEMENT_TOKEN_INVALID", "severity_default": "S3_HIGH"},
    {"code": "EQUIVOCATION_CONFLICT_PROOF_VALID", "severity_default":
"S4_CRITICAL"},
    {"code": "ANCHOR_MISMATCH", "severity_default": "S3_HIGH"},
    {"code": "CANONICAL_RECONSTRUCTION_MISMATCH", "severity_default":
"S3_HIGH"}
  ]
}
```

-continued

X6. Example JSON - incident_receipt.json
{
   "schema_version": "X1.0",
   "incident_id": "inc:2026-02-18T09:02:10Z:0007",
   "incident_epoch": "inc_epoch:0000000000000007",
   "event_type": "EQUIVOCATION",
   "severity": "S4_CRITICAL",
   "reason_code": "EQUIVOCATION_CONFLICT_PROOF_VALID",
   "subject": {
      "registry_id": "REGISTRY:release-heads:prod",
      "publisher_id": "CRA:publisher:mvg-ra-01"
   },
   "scope": {
      "deployment_scope": "ALL_LINKED_DEPLOYMENTS",
      "tenant_scope": "ALL",
      "effective_actions": ["DENY_BEFORE_INFERENCE", "QUARANTINE",
"SUSPEND"]
   },
   "bindings": {
      "registry_head_hash": "sha256:7b2d...a4c9",
      "evidence_pack_hash": "sha256:eeee...ffff",
      "anchoring_checkpoint": "sha256:aaaa...bbbb"
   },
   "effective_time": "2026-02-18T09:02:10Z",
   "expiration_time": "2026-03-18T00:00:00Z",
   "issuer_id": "CRA:incident-issuer:mvg-irc-01",
   "algorithm_suite_id": "suite:sha256+ed25519",
   "canonicalization_id": "canon:json-deterministic-v1",
   "signature_scheme_id": "sig:ed25519",
   "payload_digest": "sha256:5555...6666",
   "issuer_signature": {
      "key_id": "key:CRA:incident-issuer:mvg-irc-01#2026q1",
      "sig": "base64:MEQCIA...snip..."
   }
}
X7. Example JSON - enforcement_ack.json
{
   "schema version": "X1.0",
   "ack_id": "ack:deploy:us-west-2:2026-02-18T09:03:01Z:0042",
   "incident_id": "inc:2026-02-18T09:02:10Z:0007",
   "enforcing_deployment_id": "DEPLOY:us-west-2:cluster-03",
   "enforcement_epoch": "ack_epoch:0000000000000042",
   "enforced_scope": {
      "deployment_scope": "DEPLOY:us-west-2:cluster-03",
      "effective_actions": ["DENY_BEFORE_INFERENCE", "SUSPEND"]
   },
   "outcome": "ENFORCED",
   "enforcement time": "2026-02-18T09:03:01Z",
   "algorithm_suite_id": "suite:sha256+ed25519",
   "payload_digest": "sha256:aaaa...9999",
   "enforcer_signature": {
      "key_id": "key:DEPLOY:us-west-2:cluster-03#k7",
      "sig": "base64:MEUCIQ...snip..."
   }
}

Appendix Y—Domain Container Transport Preserving Canonical Bytes (Illustrative; Non-Limiting)

Y0. Purpose (non-limiting)

This appendix defines a domain container and manifest mechanism that preserves canonical bytes of signed payloads across transport domains (zip/tar/OCI/object-store), enabling deterministic offline verification independent of archive ordering or metadata. Any normative terms (e.g., MUST/SHOULD) appearing below describe one non-limiting example verifier contract and are not requirements of the invention and do not limit claim scope.

Y1. Deterministic Packaging Requirements (Verifier-Contract Example; Non-Limiting)

A domain container implementation MAY apply the following:

A container MUST include a manifest that commits to: payload paths, byte lengths, digests, canonicalization identifiers, algorithm suite identifiers.

A verifier MUST reconstruct canonical bytes using canonicalization_id and MUST verify signatures over canonical bytes (or digest) as specified.

If the container is an archive (zip/tar), the packager SHOULD normalize metadata (timestamps/uid/gid/mode) to deterministic values or exclude them from verification semantics by committing only to payload bytes.

Y2. Field Set-domain_container_manifest.json (non-limiting)

schema_version (string)—"Y1.0"
container_id (string)
container_type (string)—"ZIP", "TAR", "OCI", "OBJECT SET"
created_time (string, ISO 8601)

43 publisher_id (string)

algorithm_suite_id (string)

canonicalization_id (string)

entries (array of objects):

path (string)

media_type (string)

byte_length (integer)

digest (string)—digest of raw payload bytes canonical_bytes_digest (string, optional)—digest of canonical bytes (when canonicalization applies)

required (boolean)

manifest_digest (string)

manifest_signature (object)

Y3. Example Payload Set (Non-Limiting)

A non-limiting container MAY include:

artifacts/registry_head_record.json artifacts/registry_head_record.sig artifacts/evidence_pack.json artifacts/evidence_pack.sig artifacts/conflict_proof.json (optional)

verifier/verifier_bundle.json manifest/domain_container_manifest.json manifest/domain_container_manifest.sig

Y4. Example JSON—domain_container_manifest.json

```
{
  "schema_version": "Y1.0",
  "container_id": "dc:alp-11:2026-02-18:prod:001",
  "container_type": "ZIP",
  "created_time": "2026-02-18T09:10:00Z",
  "publisher_id": "CRA:publisher:mvg-ra-01",
  "algorithm_suite_id": "suite:sha256+ed25519".
  "canonicalization_id": "canon:json-deterministic-v1",
  "entries": [
    {
      "path": "artifacts/registry_head_record.json",
      "media_type": "application/json",
      "byte_length": 1874,
      "digest": "sha256:abcd...0001",
      "canonical_bytes_digest": "sha256:beef...0002",
      "required": true
    },
    {
      "path": "artifacts/registry_head_record.sig",
      "media_type": "application/octet-stream",
      "byte_length": 164,
      "digest": "sha256:abcd...0003",
      "required": true
    },
    {
      "path": "artifacts/evidence_pack.json",
      "media_type": "application/json",
      "byte_length": 5420,
      "digest": "sha256:abcd...0004",
      "canonical_bytes_digest": "sha256:beef...0005",
      "required": true
    },
    {
      "path": "artifacts/evidence_pack.sig",
      "media_type": "application/octet-stream",
      "byte_length": 164,
      "digest": "sha256:abcd...0006",
      "required": true
    {
    },
      "path": "verifier/verifier_bundle.json",
      "media_type": "application/json",
      "byte_length": 2200,
      "digest": "sha256:abcd...0007",
      "canonical_bytes_digest": "sha256:beef...0008",
      "required": true
    }
  ],
```

44

-continued

```
  "manifest_digest": "sha256:9999...8888",
  "manifest_signature": {
    "key_id": "key:CRA:publisher:mvg-ra-01#2026q1",
    "sig": "base64:MEQCIE...snip..."
  }
}
```

Y5. Offline Verifier Predicates (non-limiting)

P_MANIFEST_SIG_VALID—manifest signature valid

P_ENTRY_DIGESTS_MATCH—payload digests match manifest

P_CANONICAL RECONSTRUCTION_MATCH—canonical bytes reconstructed deterministically P_SIGNATURES_VALID—payload signatures valid over canonical bytes (or digest)

Outcomes:

PASS: all required predicates pass

FAIL: any required predicate fails

HOLD: missing required entry or unverifiable canonicalization_id

Appendix Z—Control-Point Registry & Permit Semantics (Illustrative; Non-Limiting)

Z0. Purpose (Non-Limiting)

This appendix provides optional, verifier-friendly structures for declaring (i) where deny-before-inference control points are enforced and (ii) what permit semantics apply at each control point, enabling offline verification that an authorization outcome is bound to a declared enforcement boundary. This appendix is illustrative only and does not limit claim scope.

Z1. Field Set—control_point_registry.json (non-limiting)

A control-point registry record MAY include:

schema_version (e.g., "Z1.0")

registry_id (string)

registry_epoch (string, optional; monotonic)

registry_root_hash (string)—commitment to registry content issued_time (ISO 8601)

publisher_id (string)

entries (array of control_point_descriptor objects)

algorithm_suite_id (optional)

canonicalization_id, hash_function_id, signature_scheme_id (optional)

registry_signature (object)

Each control_point_descriptor MAY include:

control point_id (string)

control_point_class (string)—e.g., "INFERENCE_API", "TOOL_BOUNDARY", "CONTAINER ENTRY", "PRIVILEGED_ACTION", "RAG RETRIEVAL"

permit_semantics_id (string)—e.g., "DENY_BEFORE_INFERENCE", "HOLD", "QUARANTINE"

required_predicates (array)—e.g.,

["CRA_OK", "ICC_OK", "VERDICT_OK", "ENTITLEMENT_OK", "EVAL RECEIPT OK"]

allowed_side_effects (array, optional)—e.g., ["NONE"] or permitted action classes scope (object, optional)—e.g., tenant, model_id, tool_class, jurisdiction profile id extensions (object, optional)

z2. Binding to Authorization Artifacts (Non-Limiting)

In some implementations, a verdict record and/or evidence pack includes:

control point_id control_point_registry_hash (or registry_id+registry_epoch+registry_root_hash)

permit_semantics_id (optional)

and the execution gate denies or quarantines when the disclosed control point information is absent, inconsistent with policy, or inconsistent with a required registry snapshot commitment.

Z3. Offline Verifier Predicates (Non-Limiting)

A verifier MAY output PASS/FAIL/HOLD for:

P_CP_REGISTRY SIG_VALID—registry signature valid (if provided)

P_CP_BOUND—evidence pack binds to a control-_point_id and registry snapshot commitment.

P_CP_SEMANTICS_MATCH—permit_semantics_id consistent with disclosed/pinned registry entry (if available)

P_CP_SCOPE_MATCH—scope constraints satisfied (if disclosed)

Outcomes:

PASS: bindings verified and consistent

FAIL: inconsistent bindings or invalid signature

HOLD: missing registry or insufficient evidence

Z4. Example JSON (Non-Limiting)

```
{ "schema_version":"Z1.0",
   "registry_id":"cp-registry:v1",
   "registry_epoch": "cp_epoch:0000000000000001",
   "registry_root_hash": "sha256:...snip...",
   "issued_time": "2026-02-18T00:00:00Z",
   "publisher_id": "CRA:publisher:mvg-ra-01",
   "entries": [
{"control_point_id":"CP:inference_api:181", "control_point_class": "INFERENCE_API",
"permit_semantics_id": "DENY_BEFORE_INFERENCE",
"required_predicates":["CRA_OK", "ICC_OK", "VERDICT_OK"], "allowed_side_effects"
:["NONE"]},
      {"control point_id":"CP:tool_boundary:tb-
01", "control_point_class":"TOOL_BOUNDARY", "permit_semantics_id": "DENY_BEF
ORE INFERENCE",
"required_predicates": ["CRA_OK","ICC_OK", "VERDICT_OK","ENTITLEMENT_OK
"], "allowed_side_effects":["TOOL_CALL_CLASS:ALLOWLISTED_ONLY"]}
   ]
}
```

Appendix AA—Receipt Graph/Multi-Agent Delegation Chain (Illustrative; Non-Limiting)

AA0. Purpose (Non-Limiting)

This appendix provides optional structures enabling a verifier to validate parent-child relationships among multiple receipts (e.g., multi-agent subtasks, delegated tool calls, or chained workflows) using commitments suitable for offline verification. This appendix is illustrative only and does not limit claim scope.

AA1. Field Set—receipt_graph_manifest.json (non-limiting)

A receipt graph manifest MAY include:

schema_version (e.g., "AA1.0")

chain_id (string)

chain_root_hash (string)—commitment to the full receipt graph root_receipt_id (string)—identifier of the root receipt (or root receipt commitment)

nodes (array)—receipt node commitments edges (array)—parent-child linkage commitments issued_time (ISO 8601)

algorithm_suite_id/canonicalization_id/hash_function_id/signature_scheme_id (optional)

manifest_signature (object, optional)

Each receipt node MAY include:

receipt_id (string)

receipt_hash (string)—digest/commitment of the receipt payload (e.g., evidence pack hash or receipt payload digest)

subject_id (optional)—e.g., model_weights_digest, container_image_digest, tool invocation class, action type control point_id (optional)

verdict_record_hash (optional)

Each edge MAY include:

parent_receipt_id (string)

child_receipt_id (string)

edge_type (string)—e.g., "DELEGATES_TO", "TOOL_CALL",

"RAG RETRIEVAL", "SUBTASK"

delegation_scope_hash (optional)—commitment to permitted scope for the child edge_hash (optional)

AA2. Evidence Pack Bindings (Non-Limiting)

In some implementations, an evidence pack includes one or more of:

receipt_id parent_receipt_id child_receipt_hashes (array, optional)

chain_root_hash (optional)

to enable offline verification of continuity and delegation structure.

AA3. Offline Verifier Predicates (Non-Limiting)

A verifier MAY output PASS/FAIL/HOLD for:

P_CHAIN CONTINUITY—parent-child links consistent with disclosed commitments

P_DAG_NO_CYCLES—no cycles detected in the disclosed graph (when graph is provided).

P_CHILD_BINDINGS_VALID—child receipts bind to required authorization artifacts (e.g., verdict record hash) (when disclosed)

Outcomes:

PASS: continuity verified

FAIL: inconsistent or cyclic structure (when sufficient data)

HOLD: insufficient disclosures to decide

AA4. Example JSON (Non-Limiting)

```
{ "schema version":"AA1.0",
   "chain_id":"chain:agentic:001",
   "chain_root_hash":"sha256 :...snip...",
   "root_receipt_id":"rcpt:root:0001",
   "nodes":[
{"receipt_id":"rcpt:root:0001", "receipt_hash":"sha256:aaa...", "control_point_id":"CP:infe
rence_api:181"},
{"receipt_id":"rcpt:child:0002", "receipt_hash": "sha256:bbb...", "control_point_id": "CP:to
ol_boundary:tb-01"},
{"receipt_id":"rcpt:child:0003", "receipt_hash": "sha256:ccc...", "control_point_id": "CP:ra
g_retrieval:rg-01"}
   ],
   "edges":[
{"parent_receipt_id":"rcpt:root:0001", "child_receipt_id":"rcpt:child:0002", "edge_type":"
TOOL_CALL"},
{"parent_receipt_id":"rcpt:root:0001", "child_receipt_id":"rcpt:child:0003", "edge_type":"
RAG_RETRIEVAL"}
   ]
}
```

Appendix AB—Credential Status Proofs (As-Of-Time) (Illustrative; Non-Limiting)

AB0. Purpose (Non-Limiting)

This appendix provides optional structures for offline-verifiable credential status evidence "as-of" a specified time, including validity-window and revocation status commitments, enabling long-horizon verification when online status services are unavailable. This appendix is illustrative only and does not limit claim scope.

AB1. Field Set—credential_status_snapshot.json (non-limiting)

A credential status snapshot MAY include:

schema_version (e.g., "AB1.0")

credential_id (string)—identifier/hash of a CRA credential, GEN participant credential, or signing key as_of_time (ISO 8601)

not_before (ISO 8601, optional)

not_after (ISO 8601, optional)

status (string)—e.g., "GOOD", "REVOKED", "UNKNOWN"

revocation_effective_time (ISO 8601, optional)

status_source (object)—one or more commitments, e.g.:

revocation_registry_checkpoint_hash transparency_checkpoint_hash ocsp_snapshot_hash/crl_snapshot_hash (non-limiting)

inclusion_proof (object, optional)—proof of inclusion/consistency for the checkpoint (non-limiting)

algorithm_suite_id/canonicalization_id/hash_function_id/signature_scheme_id (optional)

snapshot_signature (object)

AB2. Evidence Pack Bindings (Non-Limiting)

In some implementations, an evidence pack includes:

credential_status_snapshot_hash (or a reference)

as_of_time (or a reference) and an offline verifier validates that the credential used to verify an authorization artifact was valid as-of-time under the disclosed snapshot.

AB3. Offline Verifier Predicates (Non-Limiting)

A verifier MAY output PASS/FAIL/HOLD for:

P_STATUS_SIG_VALID-snapshot signature valid

P_VALIDITY WINDOW_OK—as_of time within not_before/not_after (if disclosed)

P_NOT_REVOKED_AS_OF—status indicates not revoked as-of-time, consistent with status_source commitments P_STATUS BOUND—evidence pack binds to the snapshot hash (if required)

Outcomes:

PASS: credential validity as-of-time verified

FAIL: snapshot invalid or indicates revoked as-of-time

HOLD: insufficient evidence

AB4. Example JSON (Non-Limiting)

```
{ "schema_version":"AB1.0",
   "credential_id":"sha256:cred :...snip...",
   "as_of_time":"2026-02-18T09:00:00Z",
   "not_before":"2026-01-01T00:00:00Z",
   "not_after":"2026-12-31T23:59:59Z",
   "status": "GOOD",
   "status_source": { "revocation_registry_checkpoint_hash": "sha256:rrc:...snip..."},
   "snapshot_signature": {"key_id":"key:STATUS_AUTHORITY#k1",
"sig": "base64:...snip..."}
}
```

The invention claimed is:

1. A computer-implemented execution compliance system for controlling execution of an artificial intelligence (AI) system, comprising one or more processors and a non-transitory memory storing instructions that, when executed by the one or more processors, cause the system to:

(a) receive an execution request associated with execution of the AI system, the execution request including an origin signal from an interface;

(b) generate a Root-Origin Hash Signature (ROHS) for the origin signal to produce an ROHS digest;

(c) authenticate origin of the origin signal by validating the ROHS digest using cryptographic verification material associated with a pre-issued Covenant Root Authority (CRA) credential to produce a CRA match result;

(d) validate an execution context associated with the execution request against an Immutable Constraint Chain (ICC) to produce an ICC validation result indicating whether at least one of an unauthorized execution, an execution drift, or a logic mutation is detected;

(e) route at least the CRA match result and the ICC validation result through a GEN Node arbitration process to obtain an execution authorization verdict that includes a verdict record cryptographically signed by quorum participants;

(f) control an execution gate to: (i) permit the execution request to reach at least one of (A) an inference engine or (B) a downstream action executor only when the CRA match result indicates success, the ICC validation result indicates no detected violation, the execution authorization verdict is verified, and the execution request does not match a lockout scope of an active persistent lockout state, wherein verifying the execution authorization verdict comprises (1) verifying cryptographic signatures of the quorum participants for the verdict record and (2) validating that the verdict record cryptographically binds to a hash of at least a portion of (A) the execution request or (B) an arbitration request packet derived from the execution request; and (ii) otherwise deny execution before the inference engine performs inference or before the downstream action executor performs a downstream action, and record an authorization or denial result in an Eternal Arbitration Ledger (EAL);

(g) determine, before permitting the execution request to reach the inference engine or the downstream action executor, whether a prohibited behavior condition exists based on at least one of (i) a denial-history entry in the EAL, (ii) an ICC validation failure, (iii) a trust tier classification, or (iv) detection of a policy rollback associated with a policy epoch bound to the ICC;

(h) in response to determining that the prohibited behavior condition exists, create or update, in at least one of the EAL, an Encrypted Logic Vault (ELV), or a revocation registry synchronized across linked deployments, a persistent lockout state having a lockout scope; and (i) enforce the persistent lockout state at the execution gate by denying the execution request and subsequent execution requests matching the lockout scope of the persistent lockout state before the inference engine performs inference or before the downstream action executor performs a downstream action.

2. The system of claim 1, wherein the origin signal further comprises a hardware-backed attestation token, and wherein authenticating origin further comprises verifying the hardware-backed attestation token using a verification key bound to the CRA credential.

3. The system of claim 1, wherein the ICC comprises a logic-sealed hash tree or Merkle structure defining permissible execution behaviors, encrypted and sealed at system deployment.

4. The system of claim 1, wherein the ICC is stored within an Encrypted Logic Vault (ELV) that is inaccessible to a host runtime, and wherein the system denies a runtime override attempt to modify the ICC.

5. The system of claim 4, wherein the ICC validation result includes a Merkle proof binding a constraint leaf to an ICC root hash stored in the ELV, and wherein quorum participants verify the Merkle proof before producing the execution authorization verdict.

6. The system of claim 1, wherein quorum participants of the GEN Node arbitration analyze an arbitration request packet independently and reach consensus through a Distributed Verdict Engine (DVE).

7. The system of claim 1, wherein the execution authorization verdict includes a trust tier classification validated by a Tier Trust Engine (TTE), the trust tier classification comprising at least one of Tier Alpha, Tier Beta, or Tier Gamma.

8. The system of claim 7, wherein the trust tier classification controls a quorum threshold required for cryptographically signing the verdict record based on at least a requested execution type or risk classification.

9. The system of claim 1, wherein the system validates at least one of a jurisdictional fingerprint or a compliance entropy score before permitting the execution request to reach at least one of (A) the inference engine or (B) the downstream action executor, and denies execution before performing inference or before performing the downstream action when the jurisdictional fingerprint fails to satisfy one or more criteria of a machine-readable permitted jurisdictional profile or when the compliance entropy score fails a threshold.

10. The system of claim 1, wherein the system intercepts the execution request at one or more of an inference API boundary, a model runtime wrapper, a tool-invocation boundary, a privileged action gate, or a container entry point, and withholds a call to at least one of (A) the inference engine or (B) the downstream action executor unless the execution authorization verdict is verified.

11. The system of claim 1, wherein recording in the EAL comprises storing a tamper-evident record that includes at least: (i) an ROHS hash, (ii) a timestamp, (iii) a CRA match result, (iv) a trust tier, (v) a signature hash comprising at least one of (A) a Triune Execution Signature (TES) hash or (B) a verdict record hash, (vi) a GEN Node approval flag, and (vii) a denial reason code when the execution request is denied.

12. The system of claim 1, wherein the EAL comprises a hash-chained append-only log periodically anchored to an external timestamping service or a public ledger.

13. The system of claim 1, further comprising a license entitlement engine configured to issue or validate an entitlement token bound to at least a CRA match result and a permitted execution scope, and wherein the system permits the execution request to reach at least one of (A) the inference engine or (B) the downstream action executor only when the entitlement token is validated in addition to the CRA match result, the ICC validation result, and the execution authorization verdict, and wherein the system records usage metering evidence associated with an authorized execution to at least one of the EAL or a Sovereign Signature Log (SSL).

14. The system of claim 1, wherein, in response to determining that the prohibited behavior condition exists, the instructions further cause the system to generate a signed incident receipt comprising a severity classification, a reason code, an effective time, the lockout scope of the persistent lockout state, and a cryptographic binding to at least one of an EAL record, the ICC validation result, a policy epoch identifier, or the verdict record, and to record the signed incident receipt or a hash thereof in the EAL.

15. The system of claim 1, wherein the system applies fail-closed handling such that any failure of ROHS authentication, ICC validation, verdict verification, or license validation results in denial before performing inference or before performing the downstream action, and wherein the system quarantines a request artifact and records a denial reason in at least one of the EAL or a Sovereign Signature Log (SSL).

16. A computer-implemented method of controlling execution of an artificial intelligence (AI) system, comprising:

(a) receiving an execution request associated with execution of the AI system, the execution request including an origin signal from an interface;

(b) generating a Root-Origin Hash Signature (ROHS) for the origin signal to produce an ROHS digest;

(c) authenticating origin of the origin signal by validating the ROHS digest using cryptographic verification material associated with a pre-issued Covenant Root Authority (CRA) credential to produce a CRA match result;

(d) validating an execution context associated with the execution request against an Immutable Constraint Chain (ICC) to produce an ICC validation result indicating whether at least one of an unauthorized execution, an execution drift, or a logic mutation is detected;

(e) obtaining an execution authorization verdict through a GEN Node arbitration process, the execution authorization verdict including a verdict record cryptographically signed by quorum participants;

(f) controlling an execution gate to: (i) permit the execution request to reach at least one of (A) an inference engine or (B) a downstream action executor only when the CRA match result indicates success, the ICC validation result indicates no detected violation, the execution authorization verdict is verified, and the execution request does not match a lockout scope of an active persistent lockout state, wherein verifying the execution authorization verdict comprises (1) verifying cryptographic signatures of the quorum participants for the verdict record and (2) validating that the verdict record cryptographically binds to a hash of at least a portion of (A) the execution request or (B) an arbitration request packet derived from the execution request; and (ii) otherwise deny execution before the inference engine performs inference or before the downstream action executor performs a downstream action, and record an authorization or denial result in an Eternal Arbitration Ledger (EAL);

(g) determining, before permitting the execution request to reach the inference engine or the downstream action executor, whether a prohibited behavior condition exists based on at least one of (i) a denial-history entry in the EAL, (ii) an ICC validation failure, (iii) a trust tier classification, or (iv) detection of a policy rollback associated with a policy epoch bound to the ICC;

(h) in response to determining that the prohibited behavior condition exists, creating or updating, in at least one of the EAL, an Encrypted Logic Vault (ELV), or a revocation registry synchronized across linked deployments, a persistent lockout state having a lockout scope; and (i) enforcing the persistent lockout state at the execution gate by denying the execution request and subsequent execution requests matching the lockout scope of the persistent lockout state before the inference engine performs inference or before the downstream action executor performs a downstream action.

17. The method of claim 16, further comprising detecting a replay attempt or origin signal re-use using a Recursive Consent Suppression Layer (RCSL), and denying the execution request before performing inference or before performing the downstream action upon detecting the replay attempt or origin signal re-use.

18. The method of claim 17, further comprising recording a replay indicator and a denial reason in the EAL.

19. The method of claim 16, further comprising, upon repeated denials satisfying a severity condition, issuing a revocation, suspension, or quarantine update to a registry synchronization module to propagate a suspension state across linked deployments.

20. The method of claim 16, further comprising computing a compliance entropy score from at least EAL history and ICC drift telemetry, and including the compliance entropy score in an arbitration request packet evaluated by quorum participants.

21. The method of claim 16, further comprising intercepting the execution request at one or more of an inference API boundary, a model runtime wrapper, a tool-invocation boundary, a privileged action gate, or a container entry point, and withholding a call to at least one of (A) the inference engine or (B) the downstream action executor unless the execution authorization verdict is verified.

22. The method of claim 16, further comprising generating a Triune Execution Signature (TES) and committing the TES to a Sovereign Signature Log (SSL) including a timestamp and a licensing match key identifying an entitlement record or license state associated with the authorized execution.

23. The method of claim 16, further comprising validating an entitlement token bound to a permitted execution scope and recording usage metering evidence associated with an authorized execution to at least one of the EAL or a Sovereign Signature Log (SSL).

24. The method of claim 16, further comprising applying fail-closed handling such that: (i) when ROHS authentication fails, the execution request is denied and flagged; (ii) when a license is expired or revoked, the execution request is quarantined; and (iii) when verification of at least one cryptographic signature associated with the execution authorization verdict fails, re-arbitration is triggered.

25. The method of claim 16, wherein verifying the execution authorization verdict comprises validating a triad of keys comprising an interface-associated agent credential, a Covenant Root Authority (CRA) credential record, and a GEN Node signature.

26. The method of claim 16, further comprising generating a machine-verifiable evidence pack from at least (i) a record stored in the EAL and (ii) the verdict record after an authorization or denial outcome, cryptographically signing the evidence pack, and enabling verification of the evidence pack by an independent verifier computing system that operates without access to the execution compliance system, wherein the evidence pack includes at least an ROHS hash, a CRA match result, an ICC root binding value, and a verdict binding value associated with the verdict record, and wherein the evidence pack further includes (i) a schema version identifier and (ii) at least one algorithm identifier indicating at least one of (A) a canonicalization procedure identifier, (B) a hash function identifier, or (C) a signature scheme identifier used for generating or verifying the evidence pack.

27. The method of claim 16, further comprising binding the ICC to a policy epoch identifier, including the policy epoch identifier in at least one of an arbitration request packet or the verdict record, detecting a policy rollback based on a non-monotonic policy epoch identifier, and denying the execution request before performing inference or before performing the downstream action upon detecting the policy rollback.

28. The method of claim 16, further comprising generating a privacy-preserving compliance proof, verifiable by a third-party verifier, that the execution request satisfied authorization conditions based on one or more disclosed commitments derived from at least one of the EAL or the verdict record, without revealing at least one of (i) content of the origin signal, (ii) content of the execution context, or (iii) content of the ICC, wherein the privacy-preserving compliance proof comprises at least one of a zero-knowledge proof or a selective-disclosure signature.

29. The method of claim 26, wherein the evidence pack further includes at least one of: (i) a key identifier associated with an evidence-pack signing key; (ii) a certificate chain reference or a certificate_chain_hash value; (iii) revocation status evidence comprising at least one of an OCSP response snapshot hash, a certificate revocation list snapshot hash, or a revocation registry checkpoint hash; or (iv) an anchoring checkpoint reference derived from anchoring of the EAL, such that the independent verifier computing system verifies authenticity and integrity of the evidence pack across a key rotation event or credential revocation.

30. A non-transitory computer-readable medium storing instructions that, when executed by one or more processors, cause the one or more processors to perform operations comprising the method of claim 16.

\* \* \* \* \*